(12) United States Patent
Asai et al.

(10) Patent No.: US 9,638,924 B2
(45) Date of Patent: May 2, 2017

(54) STEREOSCOPIC IMAGE DISPLAY DEVICE

(71) Applicant: NLT TECHNOLOGIES, LTD., Kanagawa (JP)

(72) Inventors: Takuya Asai, Kanagawa (JP); Koji Shigemura, Kanagawa (JP)

(73) Assignee: NLT TECHNOLOGIES, LTD., Kanagawa (JP)

( * ) Notice: Subject to any disclaimer, the term of this patent is extended or adjusted under 35 U.S.C. 154(b) by 409 days.

(21) Appl. No.: 14/185,944

(22) Filed: Feb. 21, 2014

(65) Prior Publication Data
US 2014/0240827 A1 Aug. 28, 2014

(30) Foreign Application Priority Data

Feb. 27, 2013 (JP) .................................. 2013-037249
Jan. 6, 2014 (JP) .................................. 2014-000422

(51) Int. Cl.
*G02B 27/22* (2006.01)
*H04N 13/04* (2006.01)
(Continued)

(52) U.S. Cl.
CPC ..... *G02B 27/2214* (2013.01); *H04N 13/0402* (2013.01); *H04N 13/0404* (2013.01); *H04N 13/0422* (2013.01); *H04N 2213/001* (2013.01)

(58) Field of Classification Search
CPC .............. G02B 3/0006; H04N 13/0404; G02F 1/133512; G02F 1/134336;
(Continued)

(56) References Cited

U.S. PATENT DOCUMENTS

2010/0243970 A1* 9/2010 Toshimitsu ............ G02B 5/223
252/582
2011/0187948 A1* 8/2011 Kashiwagi ............ G02F 1/1335
349/15
2012/0113100 A1 5/2012 Niioka et al.

FOREIGN PATENT DOCUMENTS

EP 2 432 242 3/2012
JP 08-149520 6/1996
(Continued)

OTHER PUBLICATIONS

JP2013037249, Asai et al., Feb. 2013, machine translation.*
Exteneded Search Report—14156568.9—Jun. 4, 2014.

*Primary Examiner* — Dave Czekaj
*Assistant Examiner* — Alison Slater
(74) *Attorney, Agent, or Firm* — Young & Thompson

(57) ABSTRACT

A stereoscopic image display device includes: a display panel on which pixels each constituted with a plurality of sub-pixels formed with electro-optic elements by corresponding to parallax images are arranged in matrix; and an optical module which distributes light emitted from the pixels arranged in the first and second directions to different directions from each other along the first and second directions, respectively. The display panel includes first and second non-control regions which are the regions existing between boundaries of apertures of the sub-pixels where control of electric-optic conversion cannot be done. An intersection part of the first and second non-control regions is disposed on a lattice point that is an intersection point of segments in a unit lattice constituted with lattice lines, and the first or the second non-control region is bent at least once within the unit lattice with respect to the lattice lines.

19 Claims, 44 Drawing Sheets

(51) Int. Cl.
*G02F 1/1335* (2006.01)
*G02F 1/13* (2006.01)
*G02F 1/13357* (2006.01)
*G02F 1/1368* (2006.01)
*G02F 1/361* (2006.01)
*G06T 15/00* (2011.01)
*G09G 3/00* (2006.01)
*H01L 27/32* (2006.01)

(58) Field of Classification Search
CPC ......... G02F 1/134309; G02F 1/136209; G02F 1/136227; G09G 3/3607
See application file for complete search history.

(56) References Cited

FOREIGN PATENT DOCUMENTS

| | | |
|---|---|---|
| JP | 3027506 | 1/2000 |
| JP | 3525995 | 2/2004 |
| JP | 4010564 | 9/2007 |
| JP | 4197716 | 10/2008 |
| JP | 2010-26499 | 2/2010 |
| JP | 2011-164148 | 8/2011 |
| JP | 4968655 | 4/2012 |

* cited by examiner

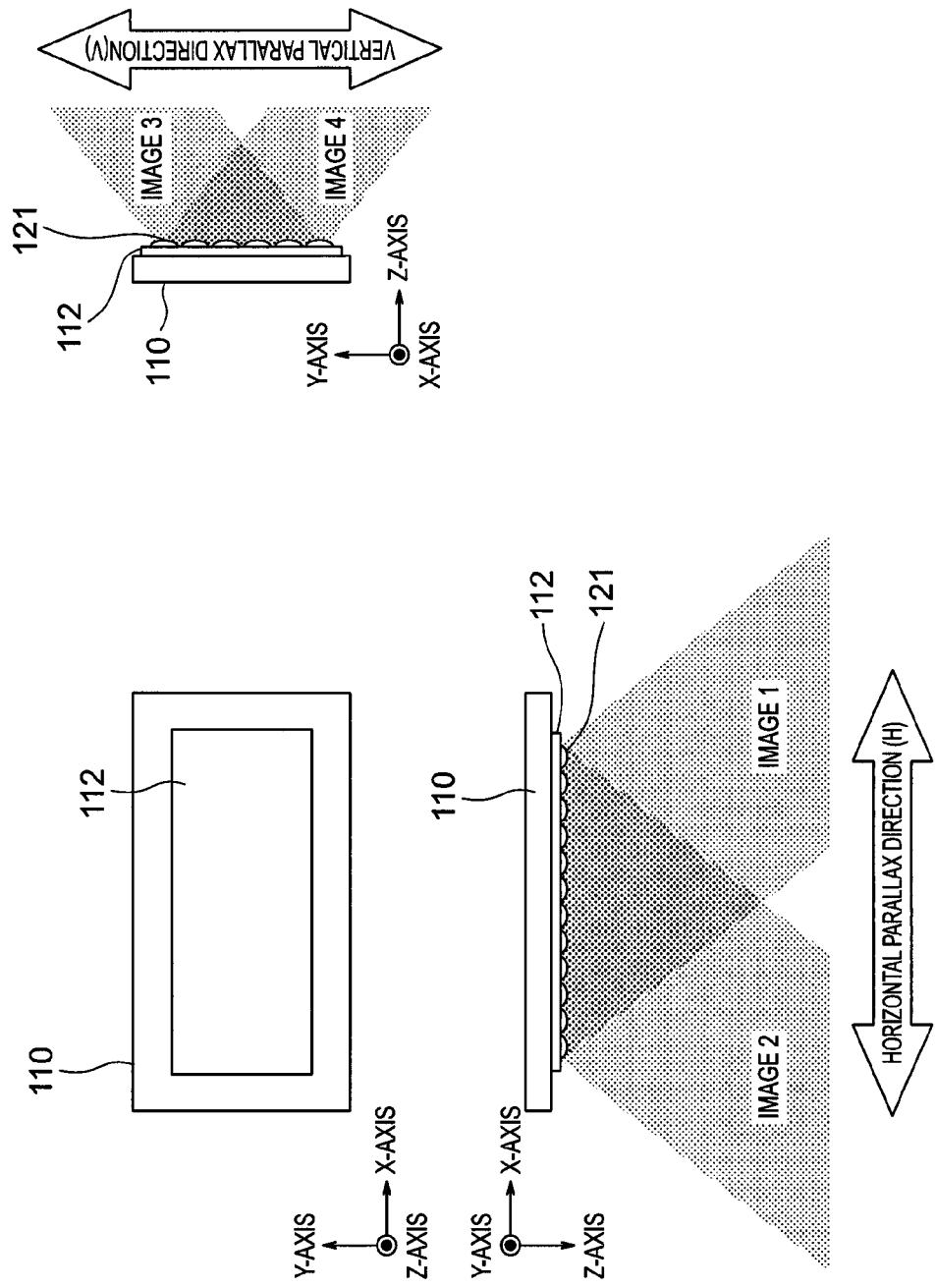

FIG. 14

| | PIXEL PITCH | RELATION BETWEEN FIRST DIRECTION AND SECOND DIRECTION |
|---|---|---|
| SQUARE LATTICE | j=k | $\theta = 90°$ |
| RECTANGULAR LATTICE | j≠k | $\theta = 90°$ |
| RHOMBIC LATTICE | j=k or j≠k | $\theta \neq 0°$ AND $\theta \neq 90°$ |

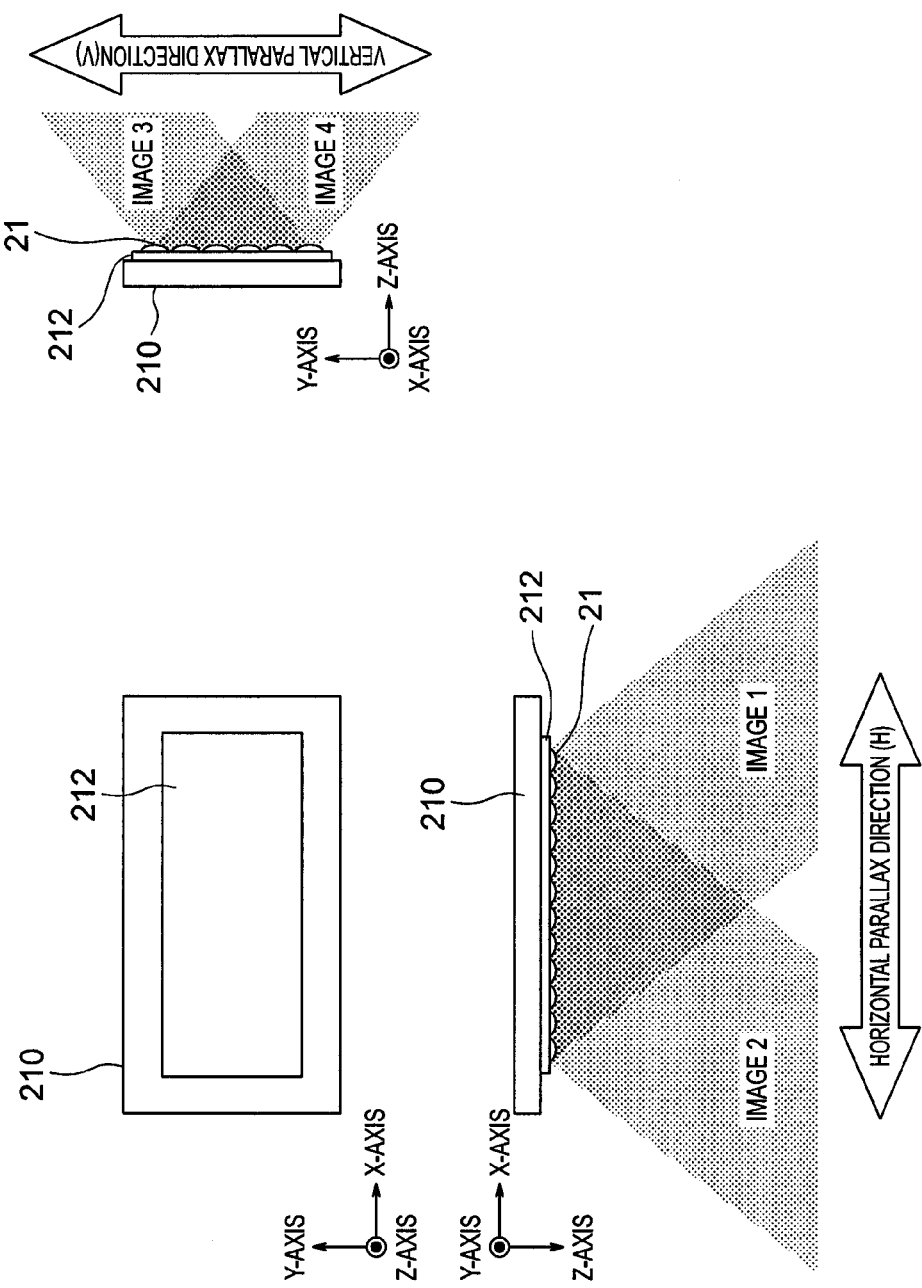

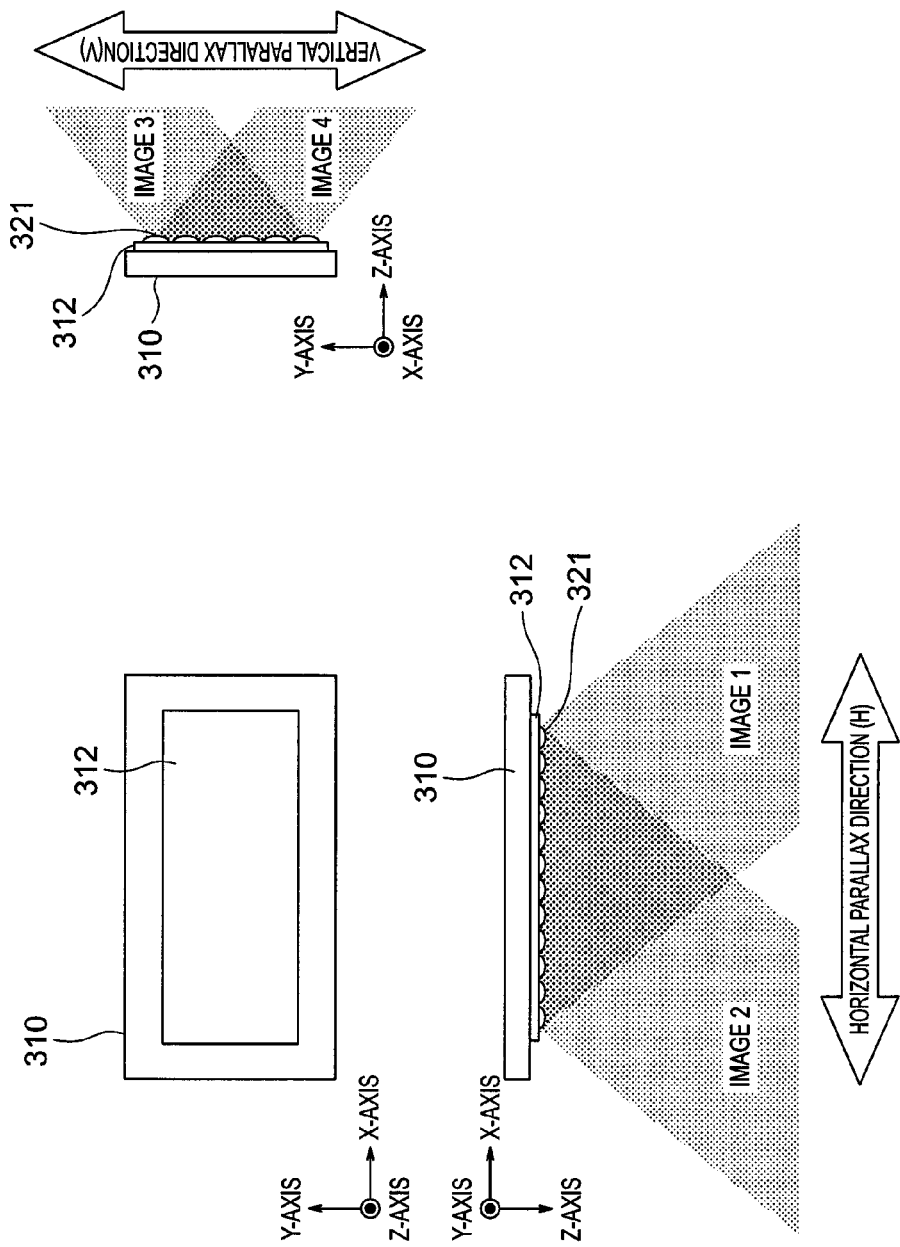

STEREOSCOPIC IMAGE DISPLAY DEVICE

CROSS-REFERENCE TO RELATED APPLICATION

This application is based upon and claims the benefit of priority from Japanese patent application No. 2013-037249, filed on Feb. 27, 2013, and No. 2014-000422, filed on Jan. 6, 2014, the disclosure of which is incorporated herein in its entirety by reference.

BACKGROUND OF THE INVENTION

1. Field of the Invention

The present invention relates to a stereoscopic image display device and, more specifically, to a stereoscopic image display device which is capable of providing bidirectional stereoscopic image display that provides parallax images for at least two viewpoints each for a first direction and a second direction simultaneously and unidirectional stereoscopic image display that provides parallax images for at least two viewpoints each for either the first direction or the second direction.

2. Description of the Related Art

For example, stereoscopic image display devices for displaying images capable of providing stereopsis in apparatuses such as television sets, personal computers, smart phones, tablets, game machines, and the like have already been spread into consumer appliances.

In general, a stereoscopic image display device is constituted with a display panel in which a plurality of pixels are provided and optical modules provided by corresponding to the pixels. In a twin-lens stereoscopic image display device, light rays from the sub-pixels corresponding to each viewpoint image are inputted as different images to each of the right eye and the left eye of an observer. This provides the observer with stereopsis.

The structure of a multi-lens stereoscopic image display device is similar to that structure. However, the design of the pixels or the optical modules and output image processing are changed to increase the number of viewpoints. This makes it possible to achieve stereopsis at a plurality of viewpoints from a greater number of observers or directions. Further, an integral photography (IP) type is a device with which a space image is displayed with element images corresponding to the position of the image and a directive lens. Thus, the structure thereof is the same as that of the structure described for the two-lens and multi-lens stereoscopic image display device.

Depicted in Japanese Patent No. 4968655 (Patent Document 1) is an existing stereoscopic image display device (referred to as a bidirectional stereoscopic image display device hereinafter) which is capable of displaying parallax images in both the horizontal direction and the vertical direction of the display device. The technique depicted therein can also be applied to various types such as the two-lens type, multi-lens type, and IP type.

There are inherent issues existing with such stereoscopic image display devices. With a general display panel, there is a region (referred to as a non-control region hereinafter) existing between boundaries of sub-pixel apertures where various kinds of signal lines shield the light or control of electro-optic conversion for applied signals cannot be done. The non-control region is expanded and projected by combining the display panel and the optical module, so that the so-called 3D moiré is observed by the observer.

The "3D moiré" is periodic luminance (or color) unevenness generated when different images are projected to different angle directions, which is fluctuation of the luminance for the viewing angle directions. There are cases where it is not an issue depending on the observing position. However, when the luminance fluctuation for the viewing angle directions is large, it is considered to impose an influence that is not preferable for stereoscopic image display. Therefore, it is desirable to make the luminance fluctuation equal to or less than a prescribed value.

The "3D moiré" is notably generated particularly when the observing position is shifted. Specifically, it is notably generated when the observing position is shifted from a stereopsis region to another stereopsis region in cases of the two-lens type or the multi-lens type stereoscopic image display device. In a case of the IP type, it is notably generated when there is a change in the space image.

For lightening the "3D moiré", there are following technical documents. Japanese Patent No. 3525995 (Patent document 2), Japanese Patent No. 4197716 (Patent document 3), and Japanese Unexamined Patent Publication 2011-164148 (Patent document 8) disclose techniques with which the aperture areas in the space separating directions within a pixel are made constant through tilting one side of the pixel obliquely, for example, and an overlapping area with neighboring sub-pixels is used in the boundary region to make the aperture areas of the pixel constant. Japanese Patent No. 3027506 (Patent Document 4) discloses a technique which suppresses the 3D moiré by designing the sub-pixels to be in a delta form.

Japanese Unexamined Patent Publication Hei 08-149520 (Patent Document 5) discloses a technique which suppresses the 3D moiré through dispersing light rays by using a diffusion sheet. Japanese Patent No. 4010564 (Patent Document 6) and Japanese Unexamined Patent Publication 2010-026499 (Patent Document 7) disclose techniques which suppress the 3D moiré by using overlapping areas of neighboring pixels by devising the shape of the sub-pixels. All of the methods depicted in Patent Documents 2 to 8 are designed to lighten the 3D moiré of stereoscopic display by mixing the image of a single viewpoint pixel with the image from other pixels.

However, it is impossible to apply the methods for lightening the 3D moiré depicted in Patent Documents 2 to 8 for the existing bidirectional stereoscopic image display device depicted in Patent Document 1. The reason is that parallax images are displayed in both the horizontal direction and the vertical direction with the bidirectional stereoscopic image display device, so that the 3D moiré is generated in four sides of a non-control region surrounding the sub-pixels. The methods depicted in Patent Documents 2 to 8 can be applied for lightening the 3D moiré in one direction. However, it is not possible with those methods to secure the luminance smoothness in the other directions. Therefore, the 3D moiré cannot be lightened.

Further, as described above, all of the methods depicted in Patent Documents 2 to 8 are designed to lighten the 3D moiré of stereoscopic display by mixing the image of a single viewpoint pixel with the image from other pixels. However, at the same time, this causes the so-called 3D crosstalk in which a display content of an image enters into another single image. In particular, the influence of the crosstalk described above becomes prominent with the bidirectional stereoscopic image display device.

This is because the boundaries between the pixels exist not only in the horizontal direction but also in the vertical direction in the bidirectional stereoscopic image display device, so that it is necessary to mix the images from the neighboring sub-pixels in both of the directions in order to overcome the 3D moiré of stereoscopic display. At this time, the stereoscopic display property is deteriorated unless mixture of the images from the sub-pixels neighboring to each other in the horizontal direction is used for the 3D moiré in the horizontal direction and mixture of the images from the sub-pixels neighboring to each other in the vertical direction is used for the 3D moiré in the vertical direction.

At the same time, with the bidirectional stereoscopic image display device, it is necessary to make the stereoscopic display image quality equivalent in any of a plurality of directions for reducing the uncomfortable feeling sensed by the observer. That is, it is necessary that the 3D moiré improved effect in the horizontal direction and the 3D moiré improved effect in the vertical direction are equivalent, and the levels of the 3D crosstalk in both directions are equivalent as well.

Patent Document 1 discloses the invention regarding the element layout in a stereoscopic image display device which displays parallax images in the horizontal and vertical directions. However, there is no statement or suggestion mentioned therein regarding the means for overcoming the 3D moiré.

As described above, the methods depicted in Patent Documents 2 to 8 can only lighten the 3D moiré in one direction, so that those methods cannot be applied to the stereoscopic image display device. For example, Patent Document 4 is designed to lighten the 3D moiré by arranging the sub-pixels in a delta layout. However, the pixels cannot be disposed in a highly dense manner with that layout. Thus, the non-control regions are increased, so that the numerical aperture cannot be improved. This is an adverse effect for achieving high luminance.

Further, with the delta layout, the closest sub-pixels are not necessarily placed by neighboring to each other along the parallax directions. Thus, the 3D moiré generated in the horizontal direction, for example, is suppressed by using the luminance compensation of the sub-pixels corresponding to the vertical parallax. Thus, with this technique, the 3D crosstalk generated in accordance with suppression of the 3D moiré is generated because of the vertical parallax images even in the horizontal direction. Therefore, fine stereopsis cannot be acquired.

It is therefore an exemplary object of the present invention to provide a stereoscopic image display device capable providing fine stereopsis by suppressing generation of the 3D moiré and influence of the 3D crosstalk even when observed from any of a plurality of directions.

SUMMARY OF THE INVENTION

In order to achieve the exemplary object, the stereoscopic image display device according to an exemplary aspect of the invention is a stereoscopic image display device capable of providing bidirectional stereoscopic image display which displays parallax images for at least two viewpoints each simultaneously for a first direction and a second direction and unidirectional stereoscopic image display which displays parallax images for at least two viewpoints each for either the first direction or the second direction, and the stereoscopic image display device includes:

a display panel in which pixels each constituted with a plurality of sub-pixels that are formed with electro-optic elements by corresponding to the parallax images are arranged in a matrix; and an optical module which distributes light emitted from the pixels arranged in the first direction to different directions from each other along the first direction and distributes light emitted from the pixels arranged in the second direction to different directions from each other along the second direction, wherein:

the display panel includes first and second non-control regions which are regions existing between boundaries of apertures of the sub-pixels where controls of electro-optic conversion cannot be done;

the first non-control region is extended along the first direction, and the second non-control region is extended along the second direction, respectively; and an intersection part of the first and the second non-control regions is disposed on a lattice point that is an intersection point of segments in a unit lattice that is constituted with lattice lines that are the segments disposed vertically and at an equivalent pitch, respectively, for the first direction and the second direction, and the first and the second non-control regions are bent at least once within the unit lattice with respect to the lattice lines.

BRIEF DESCRIPTION OF THE DRAWINGS

FIG. 12 is an explanatory chart showing the structure of a stereoscopic image display device according to a second exemplary embodiment of the present invention;

FIG. 14 is a table showing contents of each of the square lattice, the rectangular lattice, and the rhombic lattice shown in FIGS. 13A to 13C;

FIG. 15A is applied and a lens array;

FIG. 17 is an explanatory chart showing the structure of a stereoscopic image display device according to a third exemplary embodiment of the present invention;

FIG. 19 is an explanatory chart showing the structure of a stereoscopic image display device according to a fourth exemplary embodiment of the present invention;

DETAILED DESCRIPTION OF THE PREFERRED EMBODIMENTS

First Exemplary Embodiment

Figure 1:
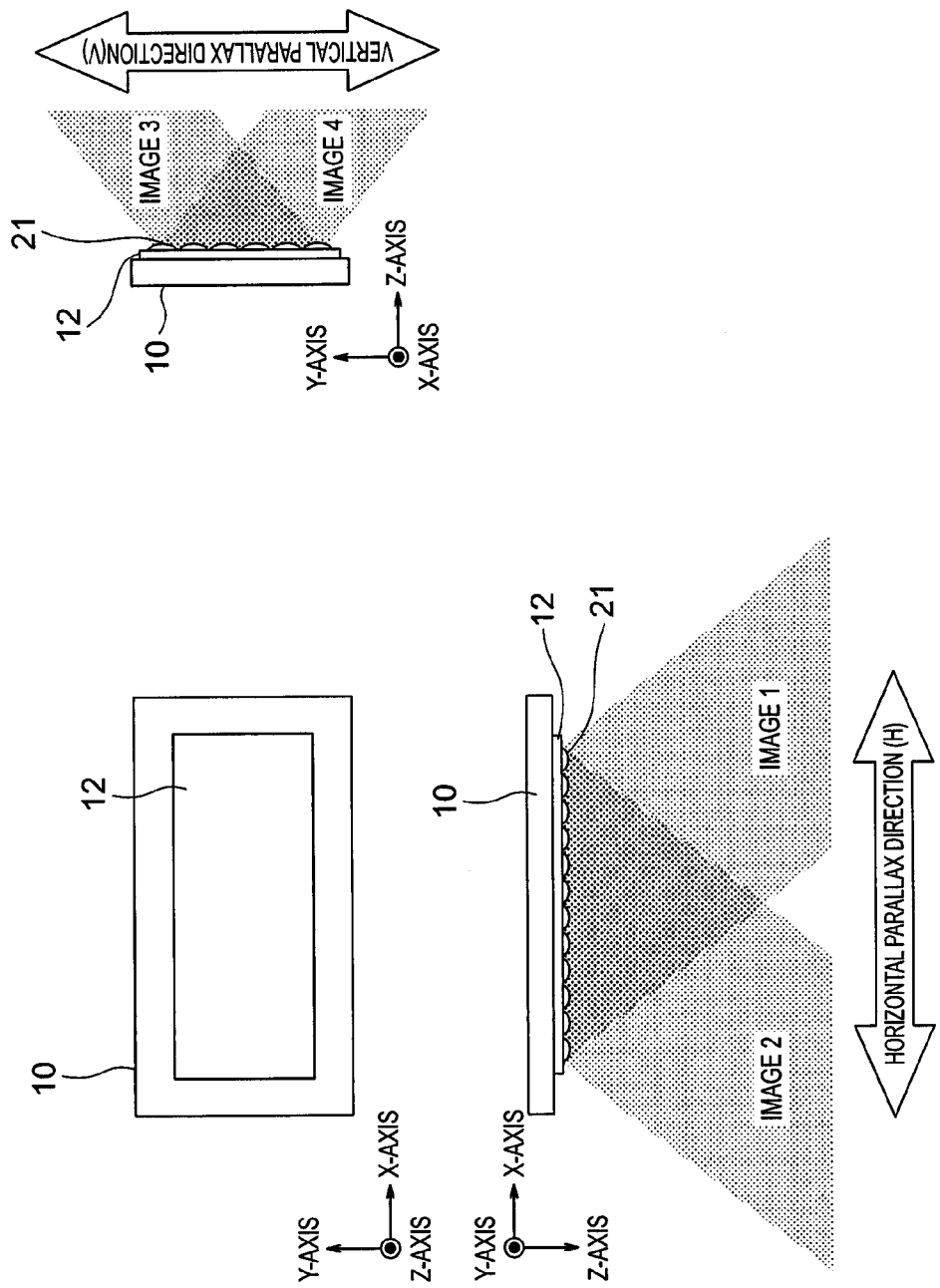
FIG. 1 is an explanatory chart showing the structure of a stereoscopic image display device according to a first exemplary embodiment of the present invention.

Hereinafter, the structure of a first exemplary embodiment of the present invention will be described by referring to accompanying drawings FIG. 1, FIG. 2, and FIG. 3. The basic content of the exemplary embodiment will be described first, and more specific content thereof will be described thereafter.

A stereoscopic image display device 10 according to the exemplary embodiment is a bidirectional stereoscopic image display device which displays parallax images for at least two viewpoints in a first direction and a second direction, respectively. The stereoscopic image display device 10 includes: a display panel 12 on which pixels 32 each constituted with a plurality of sub-pixels 31 that are formed with electro-optic elements by corresponding to parallax images are arranged in a matrix; and an optical module (lens array 21) which distributes light emitted from the pixels arranged in the first direction towards directions different from each other along the first direction and distributes light emitted from the pixels arranged in the second direction towards directions different from each other along the second direction. Further, the stereoscopic image display device 10 includes, on the display panel, first and second non-control regions 41 to 42 which are the regions existing between the boundaries of the apertures of the sub-pixels where control of electric-optic conversion cannot be done. The first non-control region is extended along the first direction, and the second non-control region is extended along the second direction, respectively. Further, an intersection part of the first and the second non-control regions is located on a lattice point that is an intersection point of segments by a unit lattice constituted with lattice lines that are segments located vertically and at equivalent pitches for the first direction and the second direction, respectively, and the first and the second non-control regions are bent at least once within the unit lattice with respect to the lattice lines. Note here that the shape of the bent part in the current Specification includes not only a polygonal shape but also an arc shape.

Note here that the first direction and the second direction are orthogonal to each other. Further, the number of bending within the unit lattice with respect to the lattice lines is the same for the first and the second non-control regions. Furthermore, it is also possible to define that the number of bending is "1", and the angle formed between the bent part of the first and the second non-control regions and the lattice line is 18 to 62 degrees. Further, it is also possible to define that the number of bending is "2", and the angle formed between the bent part of the first and the second non-control regions and the lattice line is 38 to 82 degrees.

Further, in a case where the direction in parallel to a line connecting the left eye and the right eye of an observer is defined as the horizontal direction, the direction from the left eye to the right eye is defined as the positive direction, the second direction is aligned with the horizontal direction, the positive direction with respect to the lattice line orthogonal to the horizontal direction is defined as the right side, and the negative direction is defined as the left side, the area of a first polygon formed on the right side between the lattice line and the first non-control region and the area of a second polygon formed on the left side may be defined as equivalent. Further, the area of the first polygon formed on the right side between the lattice line and the second non-control region and the area of the second polygon formed on the left side may be defined as equivalent. Furthermore, the area of the first polygon formed on the right side between the lattice line orthogonal to the horizontal direction and the first non-control region and the area of the second polygon formed on the left side as well as the area of a third polygon formed on the right side between the lattice line in parallel to the horizontal direction and the second non-control region and the area of a fourth polygon formed on the left side may all be defined as equivalent. Note here that each of the polygons formed between the lattice line orthogonal to the horizontal direction and the first non-control region and between the lattice line in parallel to the horizontal direction and the second non-control region is a triangle.

Further, provided that the length of the lattice line within the unit lattice is defined as P, the diameter of the lattice circle formed by taking the lattice point as the center is defined as D, and the normalized diameter is defined as D/P, the intersection part of the first and the second non-control regions may be defined to be located within the lattice circle having the normalized diameter of 0.1 or smaller.

With the structures described above, the stereoscopic image display device 10 can provide fine stereopsis by suppressing generation of the 3D moiré and the influence of the 3D crosstalk even when observed from any of the plurality of directions. Hereinafter, this will be described in more details.

FIG. 1 is an explanatory chart showing the structure of the stereoscopic image display device 10 according to the first exemplary embodiment of the present invention. The stereoscopic image display device 10 includes the display panel 12 in the structure to be described later and the lens array 21 that is the optical module disposed on the front face of the display panel 12.

The lens array 21 spatially separates light rays, respectively, for the two directions, i.e., the X-axis direction and the Y-axis direction that is vertical to the X-axis direction. Thus, when the X-axis is assumed as the horizontal direction, an image 1 and an image 2 are developed in the horizontal direction, and an image 3 and an image 4 are developed in the vertical direction. Thereby, stereopsis can be achieved in the double directions of the horizontal and the vertical directions. Note here that the direction in parallel to the line connecting the left eye and the right eye of the observer is defined as the horizontal direction.

As the display panel 12, it is possible to use various kinds of electro-optic elements such as a liquid crystal display element (LCD), an organic electroluminescence display element (organic EL), an electrophoretic element, an electro-chromic element, or the like. As the lens array 21, it is possible to use an optical element such as a fly-eye lens or a parallax barrier and an electro-optic element such as a liquid crystal lens capable of achieving the refractive index control or a liquid crystal barrier capable of achieving the light-shield control. However, in terms of the transmittance, it is particularly preferable to use a fly-eye lens or a liquid crystal lens.

Figure 2:
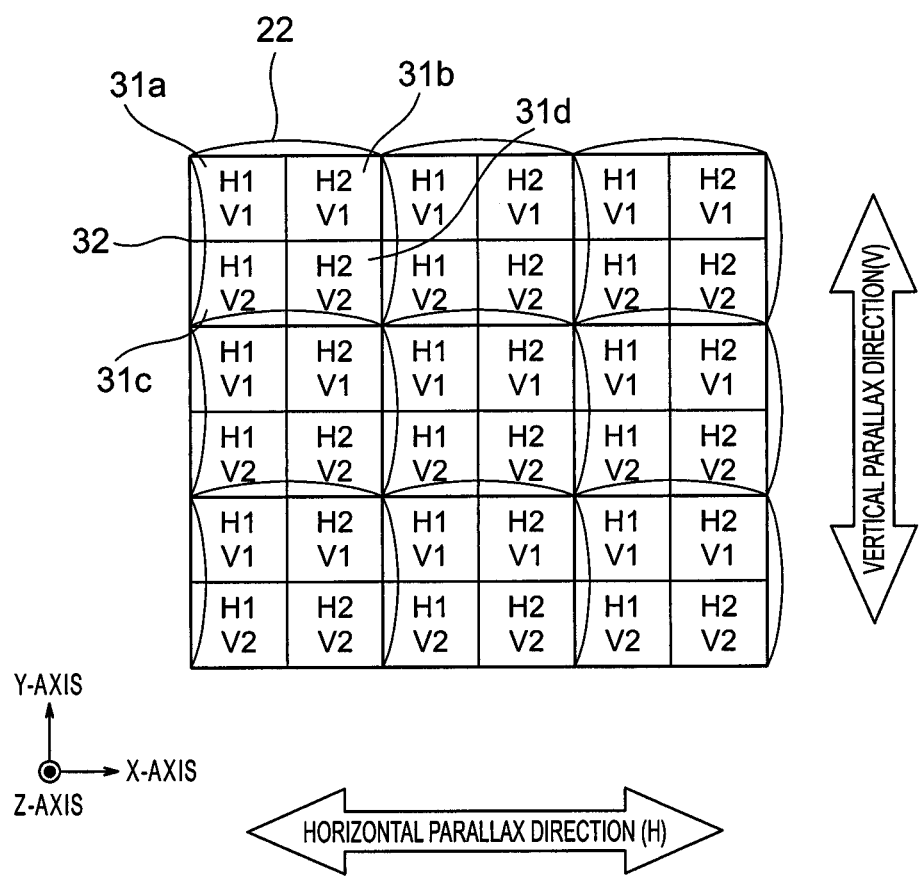
FIG. 2 is an explanatory chart showing a layout example of sub-pixels which constitute a display panel shown in FIG. 1 and lens elements which constitute a lens array.

FIG. 2 is an explanatory chart showing an example of the layout of sub-pixels 31 which constitute the display panel 12 and lens elements 22 which constitute the lens array 21 shown in FIG. 1. The display panel 12 is constituted with a great number of pixels that are arranged in a lattice form. A pixel 32 among those is constituted with four sub-pixels 31a, 31b, 31c, and 31d which are arranged in a form of 2×2, and it is a unit pixel when providing stereoscopic display. In this exemplary embodiment, each of the pixels and the sub-pixels is disposed on a square lattice.

The lens array 21 is constituted with a great number of lens elements that are disposed in a lattice form. Further, each lens element is located at a position and in a size corresponding to each pixel of the display panel 12. Here, the lens element 22 of the lens array 21 is disposed by corresponding to the pixel 32 of the display panel 12.

In FIG. 2, "H1V1", "H2V1", and the like are applied to each of the sub-pixels. The meaning of such expressions will be described. In the horizontal direction shown in FIG. 1, "H1" means a sub-pixel corresponding to the image 1, and "H2" means a sub-pixel corresponding to the image 2, respectively. Similarly, in the vertical direction shown in FIG. 1, "V1" means a sub-pixel corresponding to the image 3, and "V2" means a sub-pixel corresponding to the image 4, respectively. The layout relation of the pixel 32 that is the unit pixel when providing stereoscopic display and the sub-pixels 31 is determined according to the layout of the lenses and the positions as well as the number of the images to be displayed.

Referring to the pixel 32 as a way of example, the sub-pixel 31a displays "H1" and "V1". Thus, it is expressed as "H1V1" in FIG. 2. Similarly, the sub-pixel 31b displays "H2V1", the sub-pixel 31c displays "H1V2", and the sub-pixel 31d displays "H2V2", respectively. The density of the sub-pixels for distributing the images in the horizontal direction and the vertical direction is the same, so that the horizontal resolution and the vertical resolution are the same naturally.

Note that each of the sub-pixels H1V1, H2V1, H1V2, and H2V2 may be monochrome pixels or may be pixels using arbitrary four colors such as RGBW, RGBY, CMYK, CMYW, or the like. Further, the sub-pixels within the pixels may be arranged to be in different color layout between the pixels in such a manner that the existing probabilities of each of the colors become the same for the X-axis and the Y-axis.

Figure 3A:
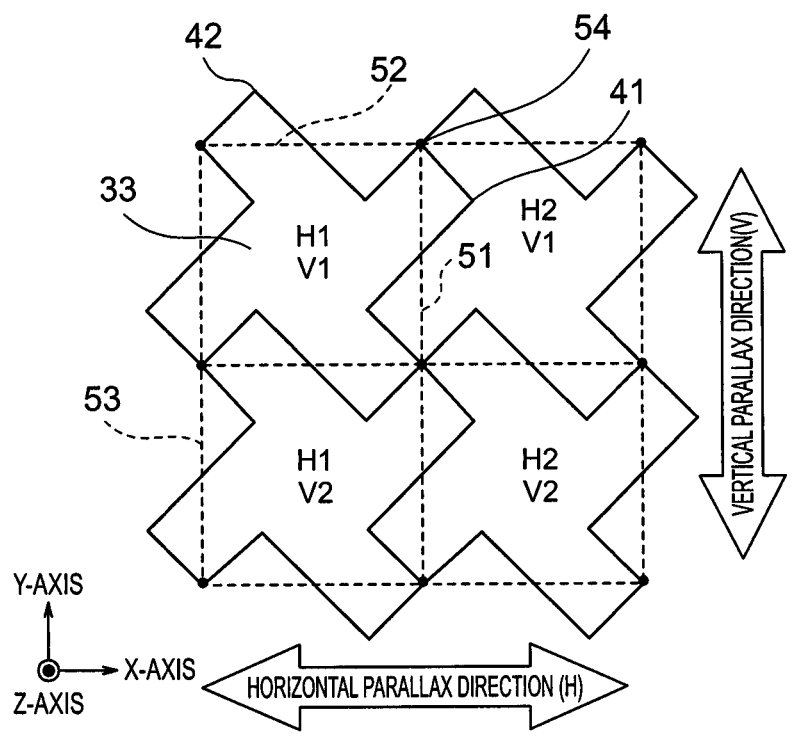
FIG. 3A is an explanatory chart showing an example (a case when an observer observes from the horizontal direction) of aperture shapes of the sub-pixels shown in FIG. 2.
Figure 3B:
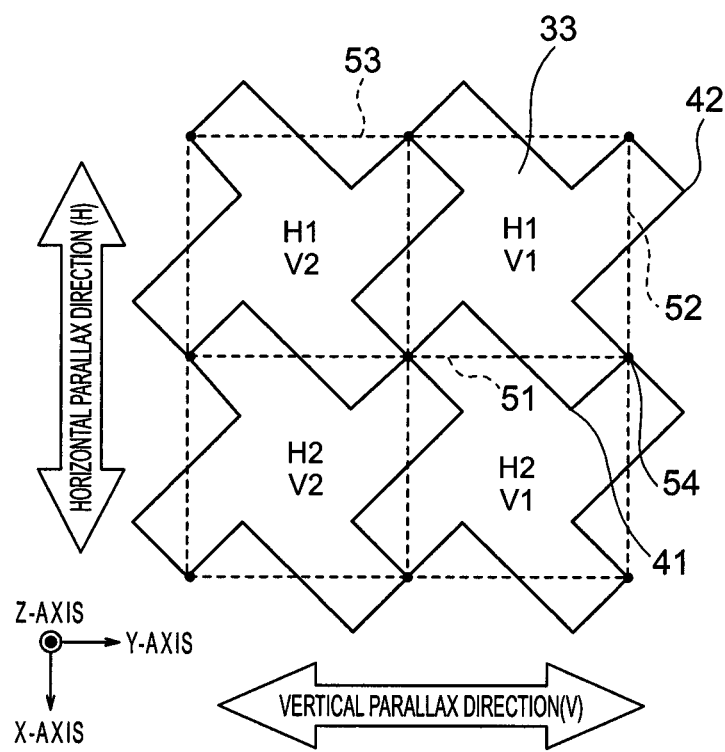
FIG. 3B is an explanatory chart showing an example (a case when an observer observes from the vertical direction) of aperture shapes of the sub-pixels shown in FIG. 2.

FIG. 3A and FIG. 3B are explanatory charts showing examples of the aperture shape of the sub-pixel 31 shown in FIG. 2. Here, the above-described horizontal direction (the direction in parallel to the line connecting the left eye and the right eye of the observer) on the display panel 12 is defined as the X-axis, the direction vertical to the X-axis on the display panel 12 is defined as the Y-axis, and the direction vertical to the display panel 12 is defined as the Z-axis, respectively. FIG. 3A is a case where the observer views from the horizontal direction, and FIG. 3B shows a case where the observer views from the vertical direction, respectively.

Regarding partitions of the sub-pixels 31 arranged in a lattice form, the direction vertical to the X-axis is defined as a first lattice line 51, and the direction vertical to the Y-axis is defined as a second lattice line 52. The first lattice line 51 and the second lattice line 52 are arranged at equivalent pitches at a pitch corresponding to the resolution of the display device for the X-axis and the Y-axis, respectively. The intersection point of the first lattice line 51 and the second lattice line 52 is defined as a square lattice point 54. A lattice having four square lattice points 54 disposed at the four corners thereof is a square lattice 53.

First, when viewed from the horizontal direction (FIG. 3A), the first non-control region 41 between the sub-pixels is bent with respect to the first lattice line 51, and the second non-control region 42 is also bent with respect to the second lattice line. Note here that the first non-control region is extended along the first lattice line, and the second non-control region is extended along the second lattice line. The point at which the first non-control region 41 and the second non-control region 42 intersect with each other matches the square lattice point 54.

In other words, the boundary line that determines the non-control region between the sub-pixels always goes over the square lattice point, and the aperture shape of the pixel is regulated in such a manner that the boundary is surrounded by a plurality of boundary lines which are bent with respect to the lattice line.

Through employing this sub-pixel shape, it is possible, when the X-axis is assumed as the horizontal direction, to prevent the 3D moiré phenomenon generated in the horizontal direction caused by expansion of the non-control regions through using luminance mixture of the neighboring sub-pixels since the first non-control region is bent and also possible to prevent the 3D moiré phenomenon generated in the vertical direction for the second non-control region as well.

For the case (FIG. 3B) when viewed from the vertical direction in a state where the XY-axes are rotated by 90 degrees with respect to the Z-axis from the case of FIG. 3A, it is also possible to prevent the 3D moiré phenomenon caused by expansion of the non-control regions as in the case where viewed from the horizontal direction as shown in FIG. 3A except that the Y-axis is the horizontal direction and the X-axis is the vertical direction. That is, it is possible to observe the same display state effectively even when the stereoscopic image display device 10 is rotated at an angle formed between the first lattice line 51 and the second lattice line.

Note that the first lattice line 51, the second lattice line 52, the square lattice 53, and the square lattice point 54 described above are all parameters employed for regulating the shape of the sub-pixel 33, and that those are virtual lines or points within the display panel.

Figure 4A:
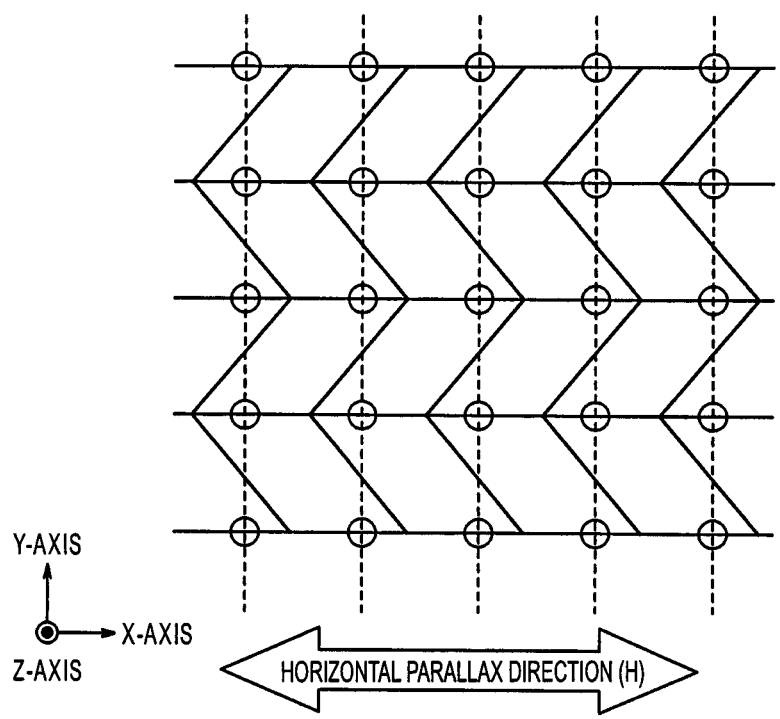
FIG. 4A is an explanatory chart showing an example of the aperture shapes of the sub-pixels shown in FIG. 2 in a case where intersection parts of non-control regions between the sub-pixels do not exist on square lattice points (intersections parts of the non-control regions between the sub-pixels are shifted from square lattice points only for one direction)
Figure 4B:
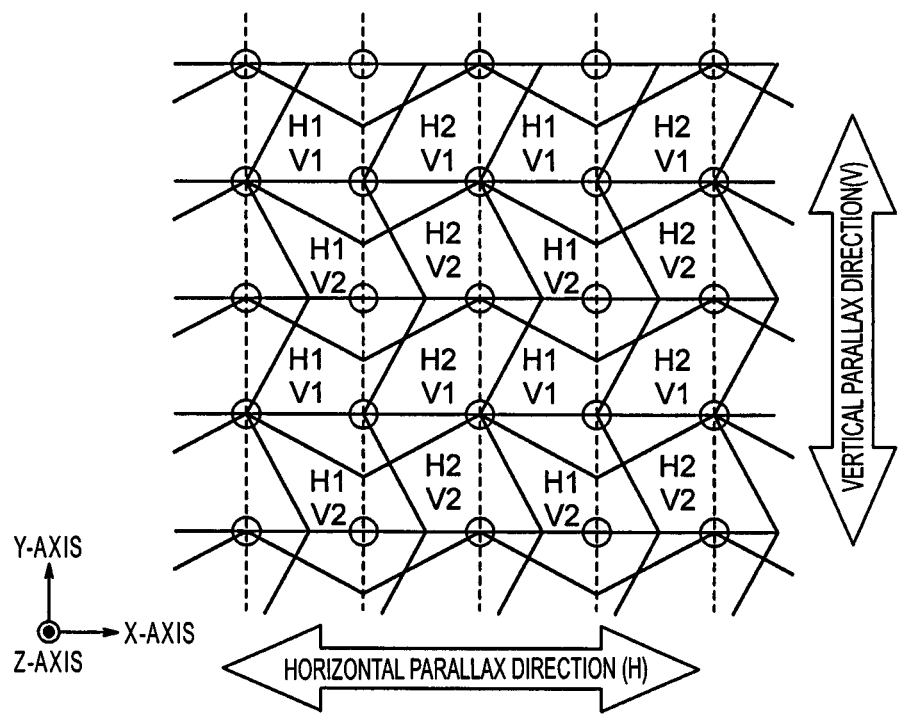
FIG. 4B is an explanatory chart showing an example of the aperture shapes of the sub-pixels shown in FIG. 2 in a case where intersection parts of non-control regions between the sub-pixels do not exist on square lattice points (intersections parts of the non-control regions between the sub-pixels are shifted from square lattice points for two directions)

FIG. 4A and FIG. 4B are explanatory charts showing examples of a case where the intersection part of the non-control regions between the sub-pixels is not on the square lattice point regarding the aperture shape of the sub-pixels shown in FIG. 2. When the intersection part of the non-control regions between the sub-pixels does not exist on the square lattice point, there are inconveniences generated in regards to two points, i.e., a point that "the horizontal parallax image is greatly mixed into the vertical parallax image" and a point that "the numerical apertures are not inform for the neighboring sub-pixels". The two points are not satisfied with the pixel shape in which the image is simply developed in two directions based on the pixel shape with which the 3D moiré is lightened in one direction as described in the conventional case.

FIG. 4A shows an example of a case where the intersection part of the non-control regions between each of the sub-pixels is shifted from the square lattice point only for one direction out of the horizontal and vertical directions, and FIG. 4B shows an example of a case where the intersection part is shifted from the square lattice point in both the horizontal and vertical directions. In FIG. 4B in particular, it is recognized that the horizontal parallax image is greatly mixed into the vertical parallax image. This is because the intersection part of the non-control regions between the sub-pixels is shifted greatly from the square lattice point so that the aperture shape of the sub-pixels cannot correspond to the double directions. This will be described later.

Figure 5:
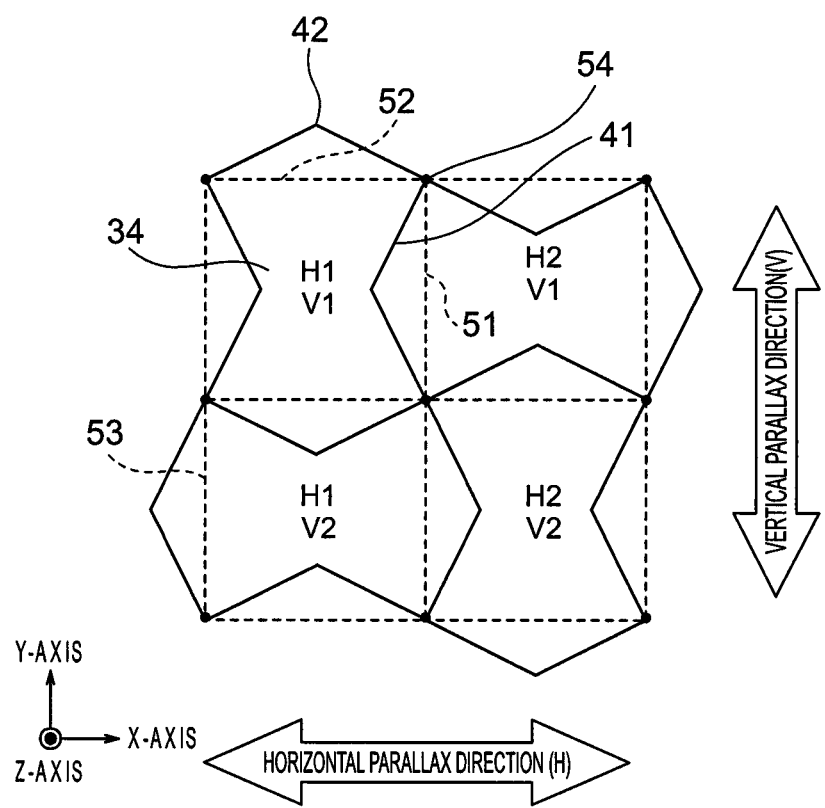
FIG. 5 is an explanatory chart showing another example of the aperture shapes of the sub-pixels shown in FIG. 2.

FIG. 5 is an explanatory chart showing another example of the aperture shape of the sub-pixels shown in FIG. 2. Regarding the non-control regions of the sub-pixels 33 shown in this example, the first non-control region and the second non-control region are both bent twice with respect to one side of a single square lattice. With this bent shape, the aperture shapes of the sub-pixels in the X-axis and Y-axis directions can all be formed in a similar shape. Thus, the aperture shapes become substantially the same between the neighboring sub-pixels (e.g., between H1V1 and H2V1, between H1V1 and H1V2), so that an excellent color balance can be achieved between each of the sub-pixels.

In the meantime, the shape of FIG. 3A and FIG. 3B shows an example of a case where the non-control regions between the sub-pixels 34 are bent once regarding both of the first non-control region and the second non-control region. However, the aperture shapes of the sub-pixels are different for the X-axis direction and the Y-axis direction, and the aperture shapes between the neighboring sub-pixels (e.g., between H1V1 and H2V1, between H1V1 and H1V2) are disposed by being rotated by 90 degrees.

However, the shape shown in FIG. 5 is advantageous in terms of securing the numerical aperture with high-definition pixels since the required number of bending is "1" and, at the same time, it is also advantageous in terms of the stereoscopic display property as will be described later. Other technical significances are the same as those of the shape of the sub-pixel 33.

Figure 6A:
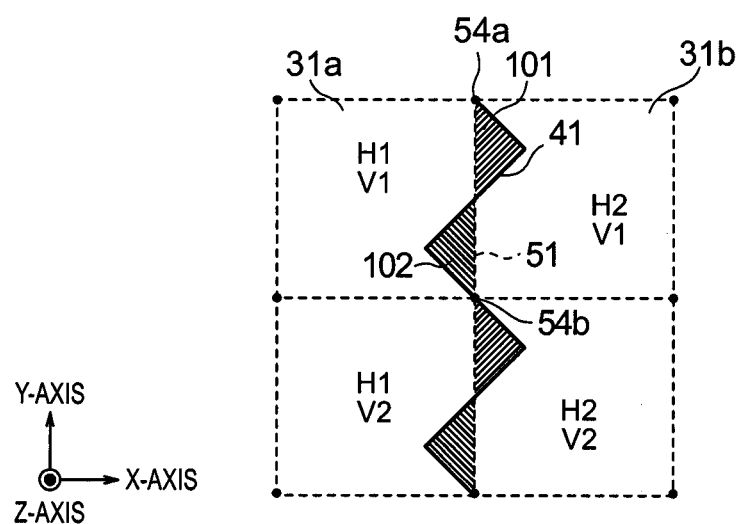
FIG. 6A is an explanatory chart showing more details of the aperture shapes of the sub-pixels shown in FIG. 3 and FIG. 5 (a case where a first non-control region is bent twice for the length of one side of the square lattice of a first lattice line)
Figure 6B:
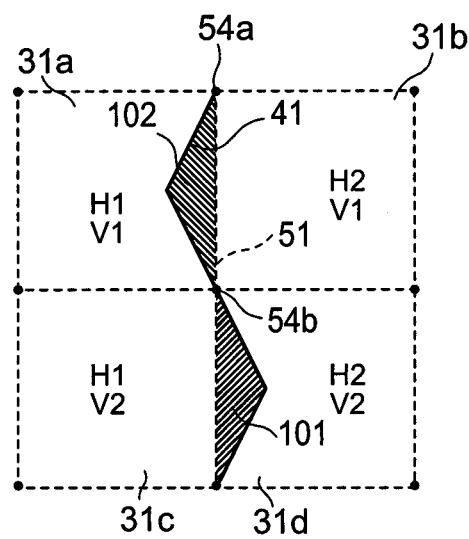
FIG. 6B is an explanatory chart showing more details of the aperture shapes of the sub-pixels shown in FIG. 3 and FIG. 5 (a case where a first non-control region is bent once for the length of one side of the square lattice of a first lattice line)
Figure 6C:
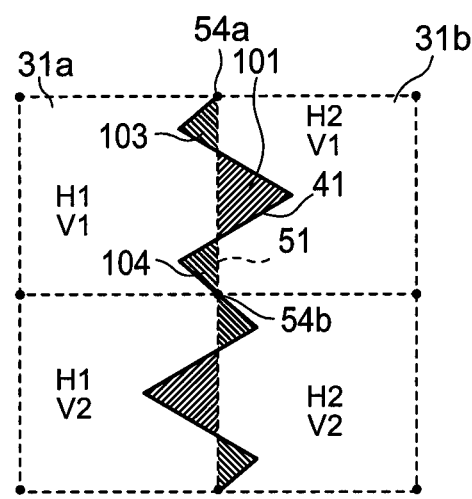
FIG. 6C is an explanatory chart showing more details of the aperture shapes of the sub-pixels shown in FIG. 3 and FIG. 5 (a case where a first non-control region is bent three times for the length of one side of the square lattice of a first lattice line)

FIG. 6A to FIG. 6C are explanatory charts showing more details of the aperture shape of the sub-pixel 33 or 34 shown in FIG. 3 and FIG. 5. In FIG. 6, only a part of the aperture shape is emphasized and illustrated for simplifying the drawings. Through bending the first non-control region 41 with respect to the first lattice line 51, a triangle surrounded by the first non-control region and the first lattice line is formed. Further, FIG. 6A to FIG. 6C show each of examples of the cases where the shape of the triangles formed according to the bent number of the first non-control region 41 and the number of the triangles per sub-pixel are different.

More specifically, FIG. 6A shows a case where the first non-control region 41 is bent twice for the length of one side of the square lattice of the first lattice line. FIG. 6B shows a case where the first non-control region 41 is bent once for the length of one side of the square lattice of the first lattice line. FIG. 6C shows a case where the first non-control region 41 is bent three times for the length of one side of the square lattice of the first lattice line.

In the case shown in FIG. 6A where the first non-control region 41 is bent twice for the length of one side of the square lattice of the first lattice line, a right-side triangle 101 and a left-side triangle 102 are formed by the first lattice line 51 and the first non-control region 41. Here, +X-axis direction with respect to the lattice line 51 is defined as "right side", and −X-axis direction is defined as "left side". The right-side triangle 101 contributes to the aperture of the sub-pixel 31a, and the left-side triangle contributes to the aperture of the sub-pixel 31b.

As described above, the square lattice points are arranged at equivalent pitch and the areas of each of the square lattices corresponding to each of the sub-pixels are the same. Thus, the aperture areas of the sub-pixels 31a and 31b can be made equivalent through equalizing the areas of the right-side triangle 101 and the left-side triangle 102. Further, the degrees of the mixture of the images of the neighboring pixels are about the same, so that a fine stereoscopic display property can be achieved.

In the case shown in FIG. 6B where the first non-control region 41 is bent once for the length of one side of the square lattice of the first lattice line, only the left-side triangle 102 exists in the sub-pixels 31a and 31b, and only the right-side triangle 101 exists in the sub-pixels 31c and 31d.

Paying attention to only the part illustrated in FIG. 6B, deviation is generated in each of the apertures between the sub-pixels 31a and 31b, and the sub-pixels 31c and 31d. However, through designing the shape of the sub-pixels in the forms shown in FIG. 5, the sub-pixels 31a to 31d can all be formed to have the same aperture shapes. Naturally, the areas of the right-side triangle 101 and the left-side triangle 102 are equivalent in this case as well.

In the case shown in FIG. 6C where the first non-control region 41 is bent three times for the length of one side of the square lattice of the first lattice line, three triangles of the right-side triangle 101 and the left-side triangles 103, 104 are formed. By making the area of the right-side triangle 101 and the sum of the areas of the left-side triangles 103 and 104 equivalent, it is possible to achieve the same effects as those of the case where the non-control region is bent twice.

There are cases where the shape becomes not the triangle but a polygon (including an arc shape) depending on the bent angles. However, the same effects as each of the cases shown in FIG. 6 can be acquired by designing each of the polygons to have the same area as in each of the cases shown in FIG. 6. Further, the same structure can be applied as well for the case of bending the region four times or more. However, in a case of a stereoscopic image display device with a small square lattice size, i.e., a stereoscopic image display device of high definition, it is desirable to employ the triangle shape in view of the 3D moiré suppression and in view of the numerical aperture.

The sub-pixels 33 and 34 shown in FIGS. 3, 5, and 6 are the cases where the non-control region is bent twice or once for all the four sides of the square lattice corresponding to the sub-pixel. However, it is not specifically essential to bend all of the four sides for the same number of times and at the same bent angles. The same effects can be acquired as the stereoscopic display property, as long as the areas of each of the polygons are equal.

Particularly when the stereoscopic image display device is used by being rotated by 90 degrees, it is preferable for all of the left-side polygon and the right-side polygon with respect to the first lattice line as well as the left-side polygon and the right-side polygon with respect to the second lattice line to have the same areas so that the stereoscopic display property including the sense of 3D moiré becomes uniform when the device is rotated by 90 degrees.

The structural modes of the non-control regions between the neighboring sub-pixels vary depending on the type of the display panel. Specifically, examples of the non-control regions may be a black matrix and signal wirings in an LCD, partition walls and signal wirings in an organic EL, partition walls and the like in a PDP. In general, those are formed in the width in the order of several μm to several tens of μm.

Further, FIG. 2 uses a fly-eye lens as the optical module. The fly-eye lenses are arranged in matrix by corresponding to each of the pixels and in parallel, respectively, to the X-axis and the Y-axis that is orthogonal to the X-axis to have the horizontal parallax and the vertical parallax with respect to the X-axis. Through separating the light rays emitted from the sub-pixels in the directions in parallel to the X-axis and the Y-axis by the lenses, it becomes possible to provide parallax in two directions.

Other than that, it is possible to use a parallax barrier or a pinhole barrier which shield light rays of undesired directions. Moreover, it is also possible to use a lens having distributed refractive indexes such as a GRIN lens using liquid crystal as a light-ray control module.

Regarding all of those optical modules, it is desirable to be able to separate light rays in the two directions simultaneously. However, it is also possible to employ the module which does not separate the light rays in the two directions simultaneously but separates the light rays in one direction at a time, e.g., the light rays are not separated in the Y-axis direction when the light rays are separated in the X-axis direction or the light rays are not separated in the X-axis direction when the light rays are separated in the Y-axis direction. When using such optical module, switching of a stereoscopic image display mode where the light rays are separated only in the first direction or the second direction and a bidirectional stereoscopic image display mode where the light rays are separated in the first and second directions simultaneously can be done by electric controls of the lens array.

With the parallax barrier or the GRIN lens constituted with an active element using liquid crystal or the like, it is possible to select the two-direction simultaneous light ray separation and one-direction-only light ray separation. When performing the one-direction-only light ray separation, the light rays may be separated through performing controls of the active elements by corresponding to the directions of the horizontal parallax in each of the cases where the stereoscopic image display device is observed in a normal direction and where the device is rotated by 90 degrees.

When the image 1 corresponding to H1V1 and the image 3 corresponding to H1V2 are the same and the image 2 corresponding to H2V1 and the image 4 corresponding to H2V2 are the same in the case shown in FIG. 2, for example, the light rays are separated only in the horizontal direction that is the X-axis direction. Similarly, when the first image and the second image are the same and the image 3 and the image 4 are the same, the light rays are separated only in the vertical direction that is the Y-axis direction.

The two parallax directions are generally determined by the normal usages of the image display device. For example, cases of changing the directions of the devices at the time of use and changing the display directions according to the application and contents in mobile phones (smartphones and feature phones), tablet terminals, game machines, and monitor displays (of personal computers and the like) correspond to that. It is sufficient to secure the directions where the observer can recognize the stereoscopic display, so that the two parallax directions do not necessarily need to be in a strictly orthogonal relation with each other.

FIG. 7 is an explanatory chart showing the bent angles and shapes of non-control regions 71a to 71f of the sub-pixel 33 or 34 shown in FIGS. 3, 5, and 6, and observed images 81a to 81c visually recognized by the observer at each of those. In FIGS. 7A to 7C, the widths of the non-control regions 71a to 71c are substantially set as constant. FIG. 7A shows a case where the bent angle $\phi a$ is about 6 degrees, FIG. 7B shows a case where the bent angle $\phi b$ is about 25 degrees, and FIG. 7C shows a case where the bent angle $\phi c$ is about 45 degrees, respectively. FIG. 7D and thereafter will be described later.

Figure 7A:
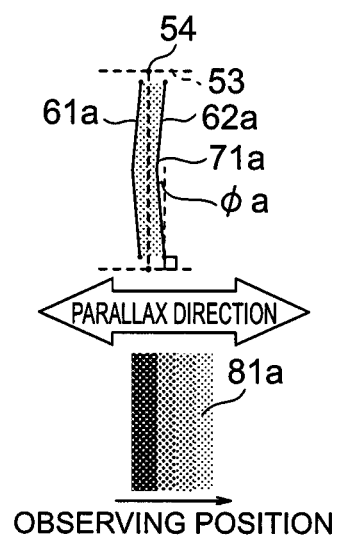
FIG. 7A is an explanatory chart showing a bent angle of the non-control region and an observed image (bent angle φa=about 6 degrees) which is visually recognized by an observer at each point regarding the sub-pixels shown in FIGS. 3, 5, and 6.

The non-control region 71a exists between neighboring sub-pixels 61a and 62b shown in FIG. 7A. The bend angle $\phi$ of the non-control region 71a is almost close to 0 degree, so that there is a dark part formed due to the non-control region for the X-axis direction that is the parallax direction. This dark part is displayed by being expanded by the optical module, and visually recognized by the observer as the 3D moiré shown in the observed image 81a.

Figure 7B:
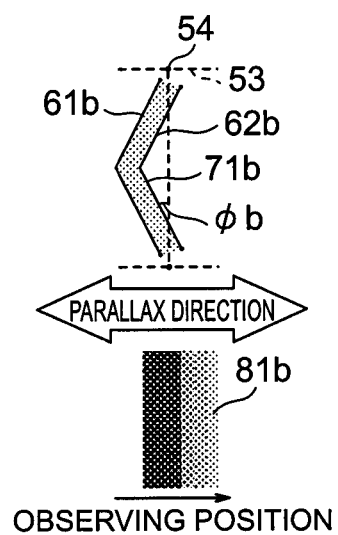
FIG. 7B is an explanatory chart showing a bent angle of the non-control region and an observed image (bent angle (φb=about 25 degrees) which is visually recognized by an observer at each point regarding the sub-pixels shown in FIGS. 3, 5, and 6.
Figure 7C:
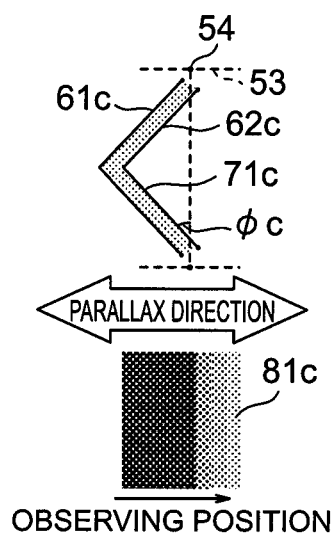
FIG. 7C is an explanatory chart showing a bent angle of the non-control region and an observed image (bent angle φc=about 45 degrees) which is visually recognized by an observer at each point regarding the sub-pixels shown in FIGS. 3, 5, and 6.

As the bent angles increase as in the cases of FIGS. 7A to 7C, the dark part of the non-control region for the X-axis is lightened. As a result, the 3D moiré is improved as shown in the observed images 81b and 81c.

Figure 7D:
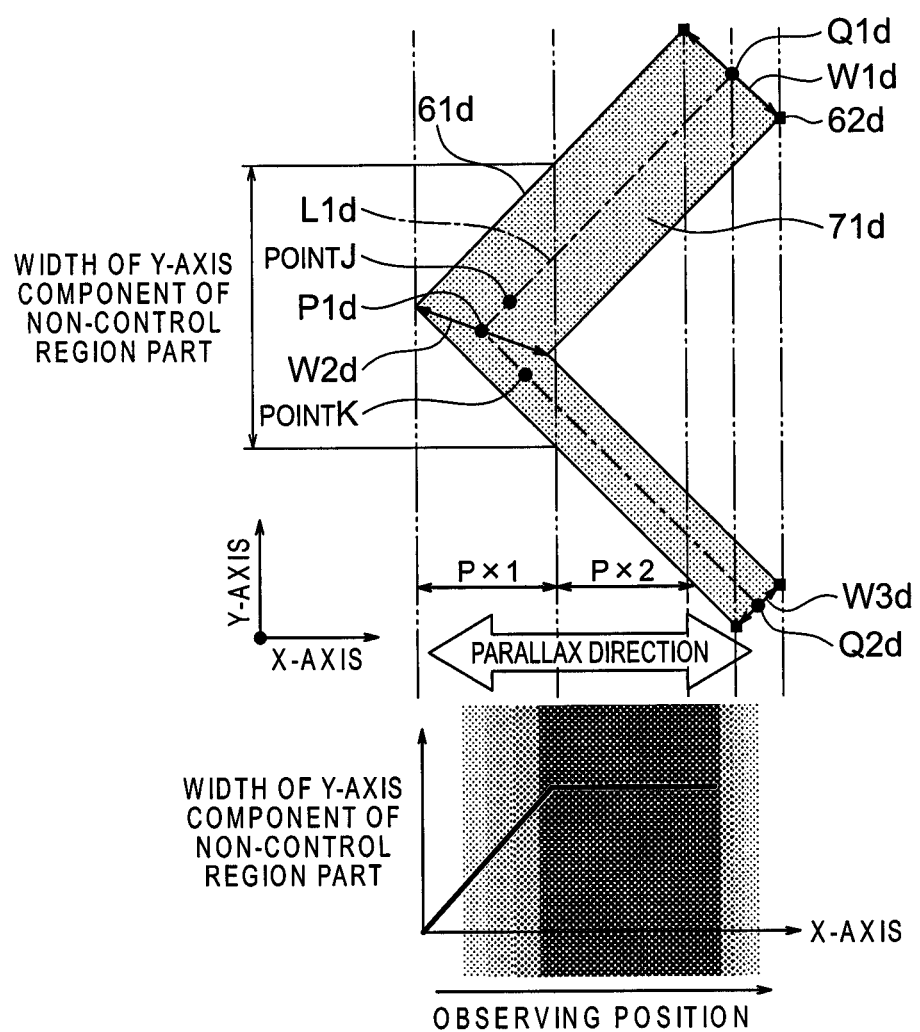
FIG. 7D is an explanatory chart showing an observed image that is visually recognized at each point in a case where two values exist for the width of the non-control region regarding the sub-pixels shown in FIGS. 3, 5, and 6.
Figure 7E:
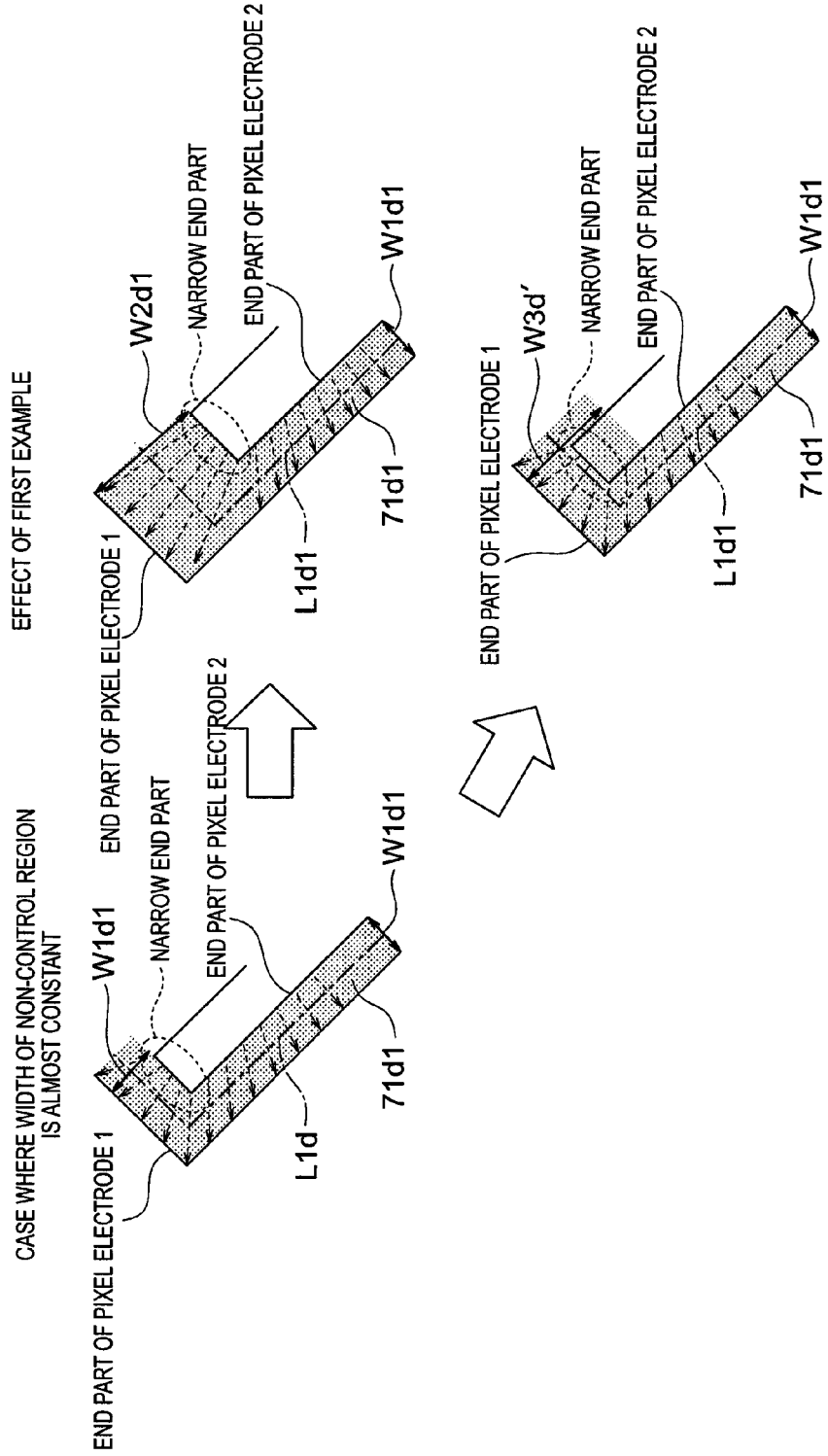
FIG. 7E is an explanatory chart showing electric fields generated in a case where the width of the non-control region is set roughly constant as W1d1 and in a case of the first example shown in FIG. 7D.
Figure 7F:
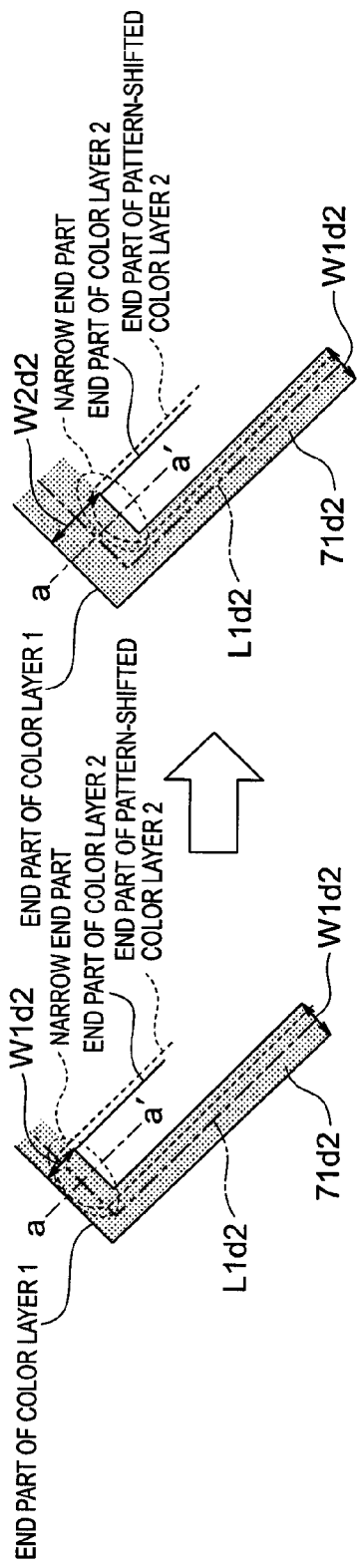
FIG. 7F is an explanatory chart showing pattern shift in color layers generated in a case where the width of the non-control region is set roughly constant as W1d1 and in a case of the first example shown in FIG. 7D.
Figure 7G:
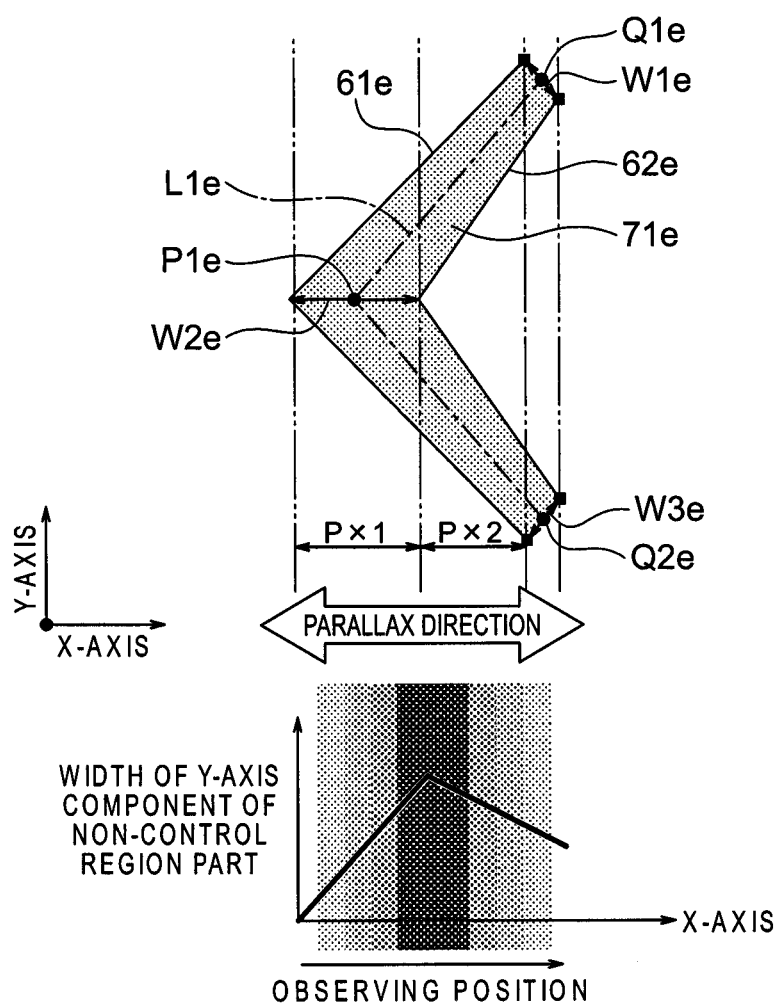
FIG. 7G is an explanatory chart showing an observed image that is visually recognized at each point in a case where the width of the non-control region continuously changes regarding the sub-pixels shown in FIGS. 3, 5, and 6.
Figure 7H:
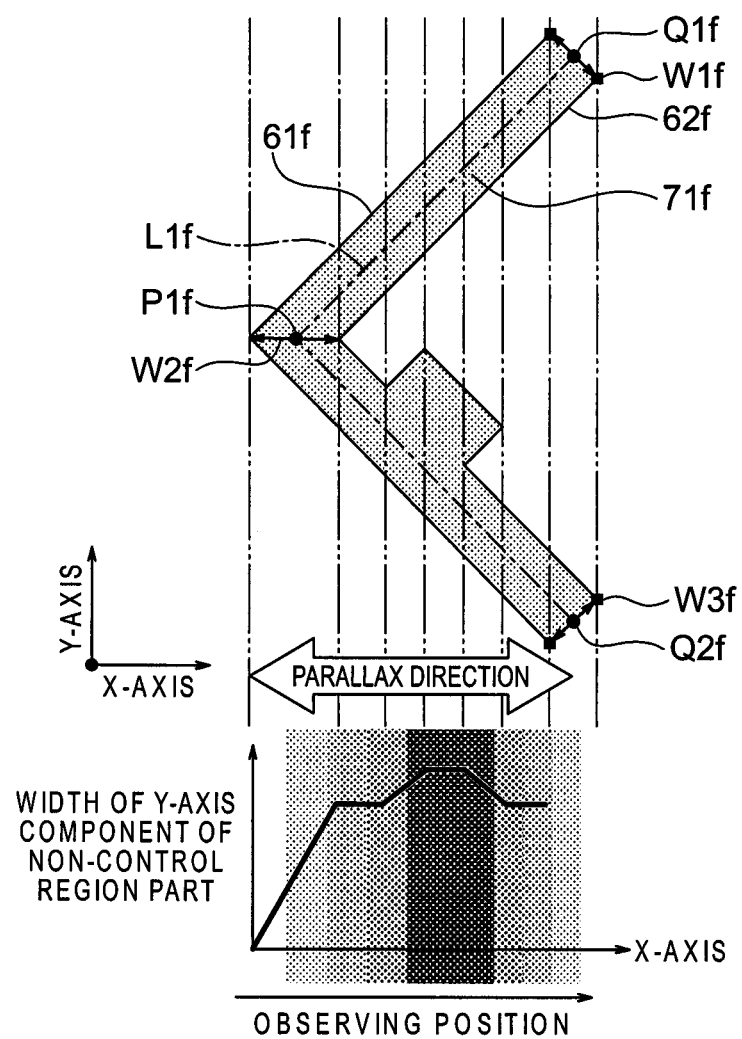
FIG. 7H is an explanatory chart showing an observed image that is visually recognized at each point in a case where the width of the non-control region discontinuously changes regarding the sub-pixels shown in FIGS. 3, 5, and 6.

While the widths of the non-control regions 71a to 71c in FIGS. 7A to 7C are set as substantially equivalent, an effect of improving the 3D moiré further can be acquired through changing the widths of the non-control regions. Hereinafter, this will be described. FIG. 7D shows the shape of the non-control region (upper side) and the observed image visually recognized by the observer at each point (lower side) in a case where there are two values for the width of the non-control region (a first example), FIG. 7G shows the same in a case where the width of the non-control region changes continuously (a second example), and FIG. 7H shows the same in a case where the width of the non-control region changes discontinuously (a third example). On the lower sides of each of the drawings FIGS. 7D, 7G, and 7H, a graph showing the width of the Y-axis component of the non-control region with respect to the X-axis position is shown by being superimposed on the observed image. FIG. 7E and FIG. 7F show the effects acquired by the first example shown in FIG. 7D.

The first example shown in FIG. 7D is an example of the case where there are two values for the width of the non-control region. The width of the non-control region at an arbitrary point on the center line L1d of the non-control region is determined according to the length of the shortest line that passes through an arbitrary point on L1d and two points on the neighboring sub-pixel boundary. In the first example, the widths of the non-control region at the unit lattice points Q1d and Q2d are defined as two values of W1d and W3d, respectively.

The width of the non-control region is set constant as W1d from the unit lattice point Q1d on the center line L1d towards the direction of the bent point P1. The width of the non-control region continuously changes from a point J in the vicinity of the bent point P1 and changes to W2d at the bent point P1d. The width of the non-control region also changes continuously from P1d to a point K. The width of the non-control region is set as constant at W3d from the point K to the direction of the unit lattice point Q2d.

Provided that the X-axis range of the width of the non-control region in the vicinity of the bent point P1d is P×1 and the X-axis range of the aperture part is P×2 in the shape of such non-control region, the value of the width of the Y-axis component of the non-control region with respect to the X-axis direction continuously changes within P×1 and it is fixed to a constant value within P×2. The 3D moiré observed by the observer is a change in the dark part in the parallax direction generated by the non-control region. When the parallax direction and the X-axis direction are substantially in parallel, the change in the dark part in the X-axis direction becomes a continuous change due to the shape. That is, this makes it possible to improve the display quality.

FIG. 7E shows charts regarding electric fields generated in a case where the width of the non-control region is substantially set as constant at W1d1 and a case of the first example shown in FIG. 7D, which show the expanded shapes of the end parts of a pixel electrode 1 and a pixel electrode 2. The end part of the pixel electrode 1 and the end part of the pixel electrode 2 are disposed as the boundary of the neighboring pixels, a narrow part exists in a part of the pixel electrode 2, and FIG. 7E show enlarged views of that narrow part.

As the non-control region, a signal wiring or a black matrix is formed. In a case where the pixel electrode 1 and the pixel electrode 2 are of different potentials, a specific electric field is generated between the two electrodes. FIG. 7E shows the electric fields in model charts of electric force lines (dotted-line arrows).

In a case of the left side of FIG. 7E where the width W1d1 of the non-control region is substantially constant, the distribution of the electric fields generated in the end part of the narrow part exhibits an extremely sharp change compared to the other areas. Undesired electric fields are generated in the pixel electrode 1 due to the sharp potential fluctuation, so that inferior display is generated in the narrow end part.

In the meantime, in a case of the left side of FIG. 7E where the first example shown in FIG. 7D is employed, the potential fluctuation can be eased while keeping the numerical aperture almost constant so that the inferior display can be lightened through setting the distance between the pixel electrode 1 and the pixel electrode 2 in the narrow end part to be wide, i.e., through setting the width of the non-control region in the narrow end part as W2d1 (>W1d1).

Further, in the case where the first example is employed, the inferior display can be covered by the black matrix or the signal wiring through setting the width of the black matrix or the signal wiring in the narrow end part to be wide while keeping the pixel electrodes as they are, i.e., through setting the width of the non-control region in the narrow end part as W3d1 (>W1d1). In both cases, useful effects for improving the display quality can be achieved.

FIG. 7F shows charts regarding the pattern shift of the color layers in the case where the width of the non-control region is substantially set as constant at W1d1 and a case of the first example shown in FIG. 7D. The upper half parts show the enlarged shapes of the pixel electrode 1 and the pixel electrode 2. The end part of a color layer 1 and the end part of a color layer 2 are disposed as the boundary of the neighboring pixels, a narrow part exists in a part of the color layer 2, and FIG. 7F shows enlarged views of that narrow part. Further, the lower parts show sectional views of the case where the width of the non-control region is set as substantially constant and the case of the first example, respectively.

As the non-control region, a signal wiring or a black matrix is formed, for example. In a case of the upper left side of FIG. 7F where the width W1d1 of the non-control region is substantially constant, there is a tendency that the pattern shift of the color layers becomes large compared to other areas as shown on the lower left side of FIG. 7F. This brings up such an issue that failures such as color mixture tend to be generated in the narrow end part because the pattern shift influences the other neighboring color layer.

Thus, through developing the first example and setting the width of the black matrix or the signal wiring in the narrow end part to be wide, i.e., through setting the width of the non-control region in the narrow end part as W2d2 (>W1d2), it is possible to lighten the inferior display by suppressing the influence of the pattern shift upon the other neighboring color layers while keeping the numerical aperture almost constant so as to prevent mixture of the color layer 1 and the color layer 2. This is also a useful effect for improving the display quality.

The second example shown in FIG. 7G is an example of the case where the width of the non-control region changes continuously. It is the feature of the second example that the width W1e of the non-control region at the unit lattice point Q1e to the width W2e at the bent point P1e continuously changes from the unit lattice point Q1e towards the direction of the bent point P1e on the center line L1e of the non-control region and, similarly, the width continuously changes from the width W2e at the bent point P1e to the width W3e at the unit lattice point Q2e from the bent point P1e towards the direction of the unit lattice point Q2e on the center line L1e of the non-control region.

Provided that the X-axis range of the width of the non-control region in the vicinity of the bent point P1d is P×1 and the X-axis range of the aperture part is P×2 in the shape of such non-control region, the value of the width of the Y-axis component of the non-control region with respect to the X-axis direction monotonously increases within P×1 and monotonously decreases within P×2. As in the case of the first example, the change in the dark part in the X-axis direction becomes a continuous change due to the shape. Therefore, it is possible to ease the 3D moiré.

In the second example, the width of the non-control region can be changed continuously with respect to the center line. Thus, it is possible to adjust the design according to the resolution, e.g., adjust the resistance value of the signal wiring that constitutes the non-control region.

The third example shown in FIG. 7H is an example of the case where the width of the non-control region changes discontinuously. It is the feature of the third example that there are two values W1f and W2f as the width of the non-control region between the bent part P1f and the unit lattice point Q2f on the center line L1f, and the change in the width is discontinuous.

Since there are discontinued points, it is feared that the dark part may become sharp. However, the non-control region is bent so that the value of the width of the Y-axis component of the non-control region for the X-axis direction becomes a continuous change or takes a constant value. Therefore, as in the cases of the first example and the second example described above, the change in the dark part in the X-axis direction becomes a continuous change, so that the 3D moiré can be eased.

Further, in the third example, the width of the non-control region with respect to the center line can be changed discontinuously from the unit lattice point to the bent point. Thus, it is possible to employ an irregular design such as disposing a switching device or a contact hole on a signal wiring.

All of the first to third examples described by referring to FIGS. 7D, 7G, and 7H show the cases where the non-control region is bent once. However, those examples can be applied to cases where the non-control region is bent twice or more, and the same effects can be acquired with those cases. More specifically, those examples can be applied to the cases where the number of bending is "2" or more through replacing the unit lattice point Q with the bent part P.

Figure 8:
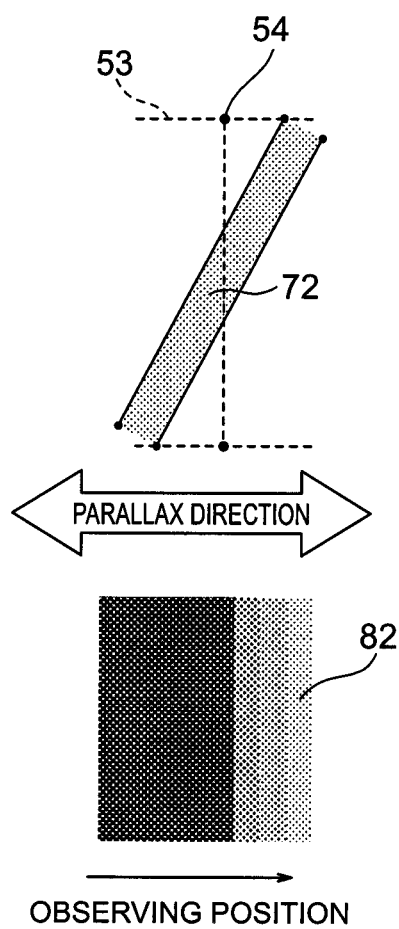
FIG. 8 is an explanatory chart showing a shape of the non-control region in the aperture shape shown in FIG. 4 where the intersection parts of the non-control regions between the sub-pixels do not exist on the square lattice points and showing an observed image visually recognized by an observer.

FIG. 8 is an explanatory chart showing the shape of a non-control region 72 in the aperture shape where the intersection part of the non-control region between the sub-pixels shown in FIG. 4 does not exist on the square lattice point, and an observed image 82 that is visually recognized by the observer. In a case where the non-control region 72 is not bent, not disposed on the square lattice point, and disposed obliquely with respect to the Y-axis, it is also possible to lighten the 3D moiré for the X-axis direction. However, in this case, the 3D moiré for both of the X-axis direction and the Y-axis direction cannot be lightened as described in FIG. 4A and FIG. 4B.

That is, through disposing all the intersection parts of the first non-control regions and the second non-control regions of the sub-pixels on the square lattice points, the 3D moiré can be lightened or prevented simultaneously for the two parallax directions.

Figure 9A:
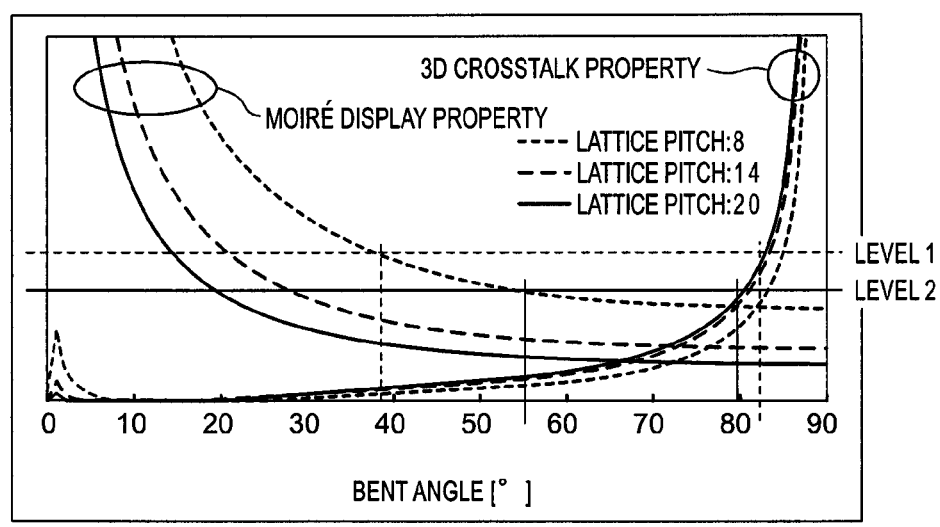
FIG. 9A is a graph showing the relation between the bent angles of the non-control region and the stereoscopic display property (a case of the sub-pixels bent twice) regarding the sub-pixels shown in FIG. 3.
Figure 9B:
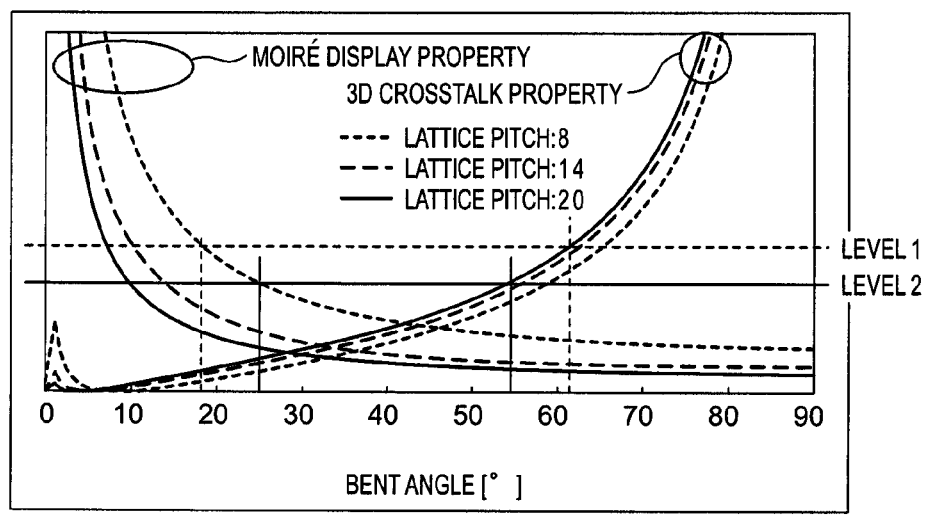
FIG. 9B is a graph showing the relation between the bent angles of the non-control region and the stereoscopic display property (a case of the sub-pixels bent once) regarding the sub-pixels shown in FIG. 5.

FIG. 9 shows graphs regarding the relations between the bent angles of the non-control regions 71a to 71c of the sub-pixel 33 or 34 shown in FIGS. 3 and 5 and the stereoscopic display property. FIG. 9A shows a case of the sub-pixel 33 that is bent twice as shown in FIG. 3, and FIG. 9B shows a case of the sub-pixel 34 that is bent once as shown in FIG. 5, respectively. In both of the graphs of FIG. 9A and FIG. 9B, the 3D moiré and the 3D crosstalk are shown as the stereoscopic display property.

The 3D moiré is a luminance fluctuation for the viewing angles shown in FIG. 8, and the subjective influence thereof is determined according to the extent of the luminance fluctuation and the angle at which the fluctuation occurs. The 3D crosstalk shows the proportion of the left-eye image (L image) mixed into the right-eye image (R image) or, inversely, the proportion of the R image mixed into the L image. When this value becomes large, it becomes difficult to provide stereopsis.

On the vertical axes of FIG. 9A and FIG. 9B, the practical upper limit values determined based on the actual optical property and the result of subjective evaluation are shown as a level 1 and a level 2. The level 1 shows a permissible property level, and the level 2 shows a desirable property level. Further, for reflecting the part that depends on the degree of high resolution, shown are cases where the lattice pitches are set as "8", "14", and "20" when the width of the non-control region is set as "1" (the lattice pitches are considered as the standardized lattice pitches hereinafter).

In both cases of FIG. 9A and FIG. 9B, as the bent angle becomes larger, the dark part of the non-control region for the parallax direction is lightened so that the 3D moiré is lightened as described above. In the meantime, the area where the images of the neighboring pixels are mixed is increased. Thus, the 3D crosstalk becomes larger, so that the stereoscopic display property is deteriorated. That is, the change in the stereoscopic display property depending on the bent angle is in a tradeoff relation of the 3D moiré and the 3D crosstalk.

Further, when the standardized lattice pitch is changed, the stereoscopic display property becomes changed as well. Regarding the 3D moiré, the relative non-control region for the lattice pitch is expanded. Thus, the 3D moiré is deteriorated as the standardized lattice pitch becomes smaller at the same bent angle. In the meantime, regarding the 3D crosstalk, the mixed area of the neighboring sub-pixel becomes smaller when the relative non-control region for the lattice pitch becomes expanded. Thus, the 3D crosstalk is improved as the standardized lattice pitch becomes smaller at the same bent angle. However, through comparing FIG. 9A with FIG. 9B, it can be seen that the change in the stereoscopic display property with respect to the change in the standardized lattice pitch largely depends on the number of bending.

Looking at the total of the standardized lattice pitches 8, 14, and 20 in FIG. 9A (the case of the sub-pixel 33 that is bent twice as shown in FIG. 3), the bent angle is desired to be within the range of 38 to 82 degrees for the level 1, and desired to be within the range of 55 to 80 degrees for the level 2. When the standardized lattice pitch 8 is omitted therefrom, the range of the bent angle is widened further. Thus, the range of 22 to 82 degrees is the preferable range for the level 1, and the range of 28 to 80 degrees is the preferable range for the level 2. That is, with the sub-pixel shape that is bent twice, it can be seen that there is a large difference between the bent angle ranges that can be employed for the standardized lattice pitches 8 and 14.

Looking at the total of the standardized lattice pitches 8, 14, and 20 in FIG. 9B (the case of the sub-pixel 34 that is bent once as shown in FIG. 5), the bent angle is desired to be within the range of 18 to 62 degrees for the level 1, and desired to be within the range of 24 to 53 degrees for the level 2. When the standardized lattice pitch 8 is omitted therefrom, the range of the bent angle is widened further. Thus, the range of 10 to 62 degrees is the preferable range for the level 1, and the range of 13 to 53 degrees is the preferable range for the level 2.

That is, the difference between the bent angle ranges of the standardized lattice pitches 8 and 14 is smaller with the shape of the sub-pixel 34 that is bent once compared to the case of FIG. 9A. Further, when compared only for the standardized lattice pitch 8, the bent angle range is smaller in the case of FIG. 9B. That is, in a case where the standardized lattice pitch is small, i.e., in a case of high definition, the case of FIG. 3 with bending of twice is desirable than the case of FIG. 4 with bending of once. This is the same as the explanation provided by referring to FIG. 5.

While the examples where the non-control region between the sub-pixels is disposed on the square lattice point are presented heretofore, the square lattice point can be considered as a square lattice circle depending on the size of the square lattice. The reason that the intersection part of the non-control regions between the sub-pixels need to exist on the square lattice is "to secure the uniformity of the numerical apertures between the neighboring sub-pixels" as described above. The value of the radius the square lattice circle in that case is derived from the permissibility of the fluctuation of the numerical apertures between the neighboring sub-pixels.

Figure 10:
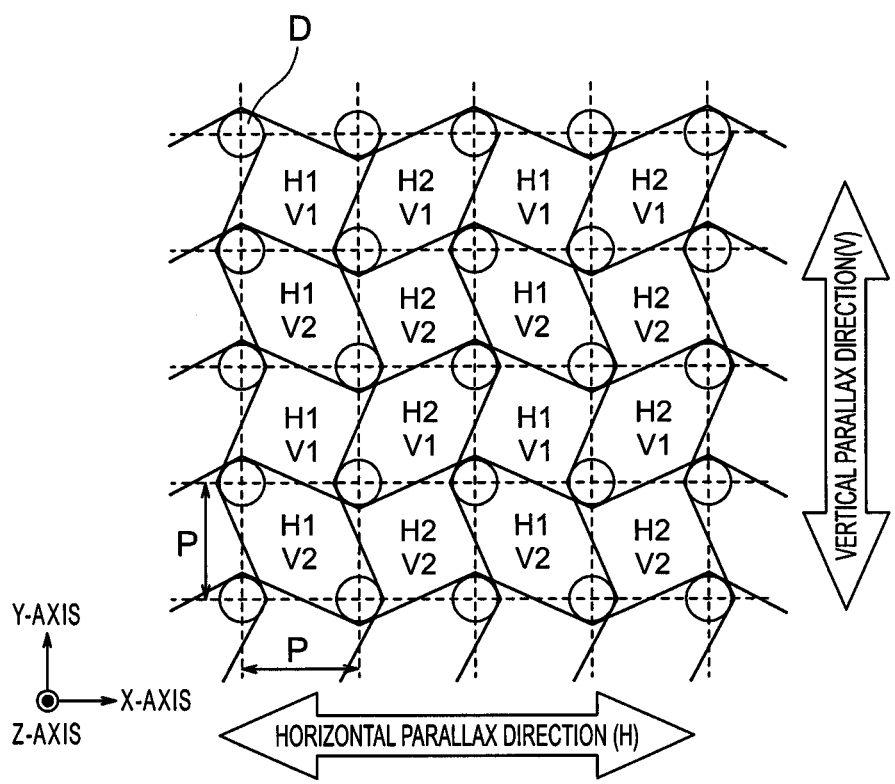
FIG. 10 is an explanatory chart showing an example of a case where intersection parts of first non-control regions and second non-control regions are located on square lattice circles having diameter of D regarding the sub-pixels shown in FIGS. 3, 5, and 6.

FIG. 10 is an explanatory chart showing an example of a case where the intersection parts of the first non-control regions and the second non-control regions are disposed on the square lattice circles with the diameter D in the sub-pixel 33 or 34 shown in FIGS. 3, 5, and 6. In that case, as the value of the diameter D of the square lattice circle becomes larger with respect to the length P of one side of the square lattice, the fluctuation in the numerical apertures between the neighboring sub-pixels becomes larger.

Figure 11:
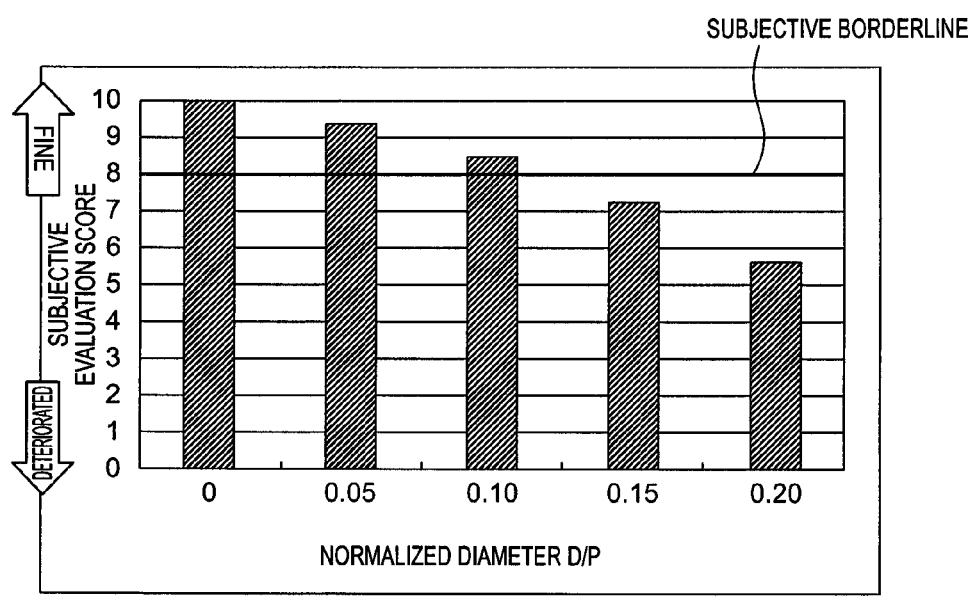
FIG. 11 is a graph showing the subjective evaluation of the levels the color shift display property caused due to the unevenness of each color luminance with respect to the extent of the normalized diameter D/P in a case shown in FIG. 10 where the intersection parts of the first non-control regions and the second non-control regions are located on the square lattice circles having the diameter of D.

FIG. 11 is a graph showing the subjective evaluation of the display property levels in the color shift caused due to the nonuniformity in the luminance of each color with respect to the extent of the normalized diameter D/P in a case where the intersection parts of the first non-control regions and the second non-control regions shown in FIG. 10 are disposed on the square lattice circles of the diameter D. Note here that P is the pitch of the square lattices at which the sub-pixels 33 or 34 are disposed.

The sub-pixels within the pixels are arranged to be in different color layout between each of the pixels so that the existence probabilities of each color become the same for the X-axis and the Y-axis. Based on the result of the evaluation, it is found to be permissible as the display property of the display when the size of the normalized diameter D/P of the square lattice circle is 0.1 or smaller. When the normalized diameter D/P exceeds 0.1, the non-uniformity for the color visual field angle becomes actualized according to deterioration in the uniformity of the aperture areas of each of the sub-pixels, thereby deteriorating the display quality greatly as the color shift. Therefore, it is desirable to set the diameter D of the square lattice circle as 0.1 or smaller with respect to the square lattice pitch P.

The stereoscopic image display device 10 according to the first exemplary embodiment described above can prevent the horizontal parallax image from being largely mixed into the vertical parallax image and secure the uniformity of the numerical apertures between the neighboring sub-pixels when the first direction is taken as the horizontal direction and the second direction is taken as the vertical direction. Therefore, it is possible to suppress both the 3D moiré and the 3D crosstalk. Further, it is possible to acquire the same 3D resolution for the horizontal direction and the vertical direction, so that the same stereoscopic display property can be acquired through rotating the display device by 90 degrees.

The stereoscopic image display device 10 is suitable for those capable of changing the display direction according to the facing direction of the device when in use and according to the application and contents in mobile phones (smart phones and feature phones), tablet terminals, game machines, and monitor displays (of personal computers and the like).

As an exemplary advantage according to the invention, the present invention is structured to properly distribute the light emitted for a plurality of directions with the optical modules. This makes it possible to provide the stereoscopic image display device which exhibits such an excellent characteristic that it is capable providing fine stereopsis by suppressing generation of the 3D moiré and influence of the 3D crosstalk even when observed from any of a plurality of directions.

Further, as a result of improving the 3D moiré in the two different directions, it becomes possible to provide fine stereopsis by suppressing generation of the 3D moiré and influence of the 3D crosstalk even when observed from directions other than the plurality of directions.

Second Exemplary Embodiment

A stereoscopic image display device 110 according to a second exemplary embodiment of the present invention is structured to dispose each of the sub-pixels, which is disposed on the square lattice in the first exemplary embodiment, on a rectangular lattice or a rhombic lattice.

With the above-described structure, the same effects as those of the first exemplary embodiment can be acquired even with the stereoscopic image display device constituted with the pixels disposed on the rectangular lattice or the rhombic lattice.

This will be described in details hereinafter.

FIG. 12 is an explanatory chart showing the structure of the stereoscopic image display device 110 according to the second exemplary embodiment of the present invention. The stereoscopic image display device 110 includes a display panel 112 to be described later and a lens array 121 that is an optical module disposed on the front face of the display panel 112. The structures of the display panel 112 and the lens array 121 are equivalent to those of the first exemplary embodiment, but shapes of each of those are different from those of the first exemplary embodiment.

That is, the display panel 112 in this exemplary embodiment is structured by disposing each of the sub-pixels on the rectangular lattice or the rhombic lattice, while each of the sub-pixels is disposed on the square lattice in the first exemplary embodiment.

Figure 13A:
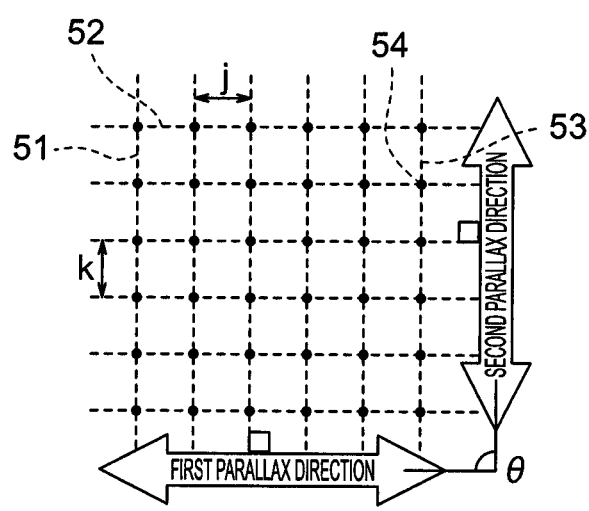
FIG. 13A is an explanatory chart showing the appearance of a square lattice where each of the sub-pixels is disposed on a display panel 112 shown in FIG. 12.
Figure 13B:
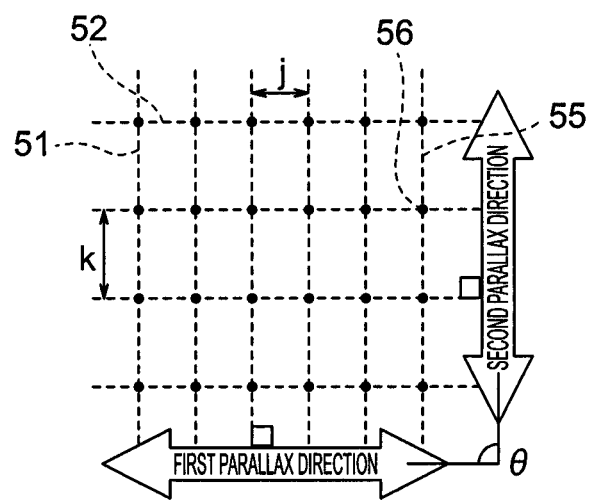
FIG. 13B is an explanatory chart showing the appearance of a rectangular lattice where each of the sub-pixels is disposed on the display panel 112 shown in FIG. 12.
Figure 13C:
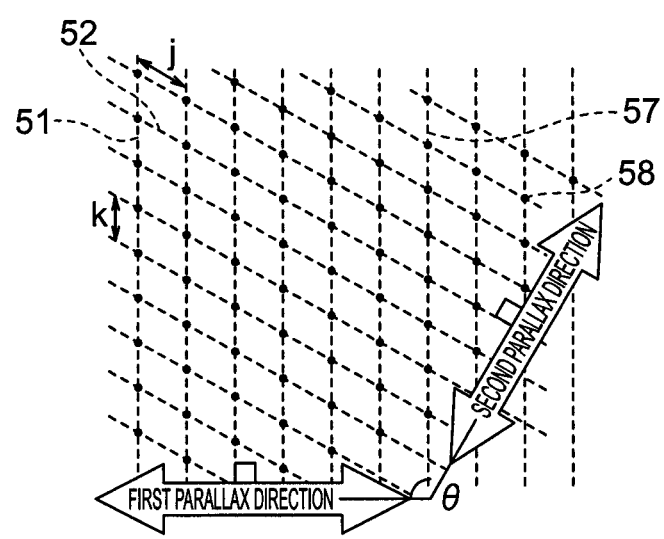
FIG. 13C is an explanatory chart showing the appearance of a rhombic lattice where each of the sub-pixels is disposed on the display panel 112 shown in FIG. 12.

FIG. 13 shows explanatory charts regarding the external appearances of the square lattice, the rectangular lattice, and the rhombic lattice where each of the sub-pixels is disposed on the display panel 112 shown in FIG. 12. FIG. 13A shows a square lattice 53, FIG. 13B shows a rectangular lattice 55, and FIG. 13C shows a rhombic lattice 57, respectively.

In all of the charts, first lattice lines 51 in the direction vertical to the first parallax direction and second lattice lines 52 in the direction vertical to the second parallax direction are shown. Further, the first lattice lines 51 are arranged at an equivalent pitch at a pitch j for the first parallax direction, and the second lattice lines 52 are arranged at an equivalent pitch at a pitch k for the second parallax direction. Note here that the pitch j and the pitch k are determined by corresponding to the resolution of the display panel. The resolution is the number of pixels per unit length, and j and k in FIG. 13 are the sub-pixel pitches. In general, the relation between the number of pixels and the number of sub-pixels is determined uniquely according to the display type of the display. Thus, in the present invention, "according to the resolution" can be so comprehended that the pitch includes the sub-pixel pitch or the pixel pitch.

In the square lattice 53 shown in FIG. 13A, it is defined that the pitch j=k and the angle θ formed between the first parallax direction and the second parallax direction is θ=90 degrees. In the rectangular lattice 55 shown in FIG. 13B, it is defined that the pitch j≠k and the angle θ formed between the first parallax direction and the second parallax direction is θ=90 degrees. In the rhombic lattice 57 shown in FIG. 13C, it is defined that the pitch may be j=k or j≠k and the angle θ formed between the first parallax direction and the second parallax direction is θ≠90 degrees.

The intersection point between the first lattice line 51 and the second lattice line 52 is a square lattice point 54 in FIG. 13A, a rectangular lattice point 56 in FIG. 13B, and a rhombic lattice point 58 in FIG. 13C. FIG. 14 is a table showing each content of the square lattice 53, the rectangular lattice 55, and the rhombic lattice 58 shown in FIG. 13A to FIG. 13C.

Figure 15A:
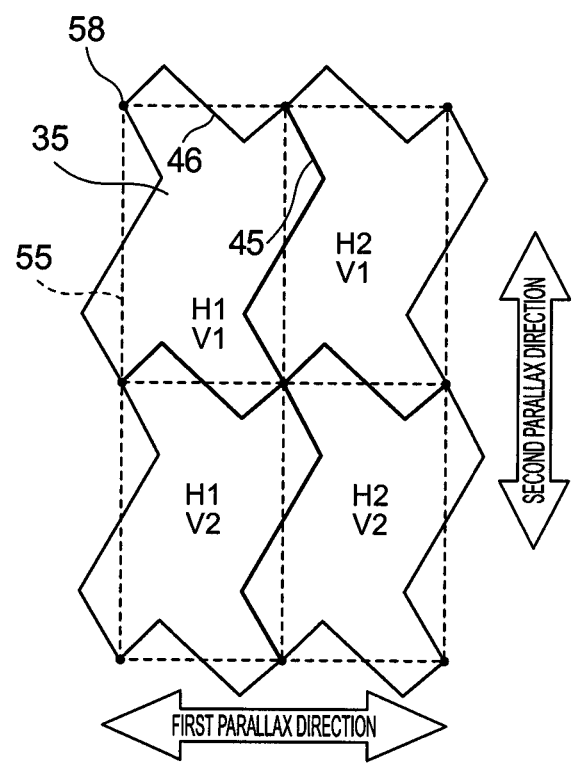
FIG. 15A is an explanatory chart showing the sub-pixels to which the rectangular lattice shown in FIG. 13B is applied.
Figure 15B:
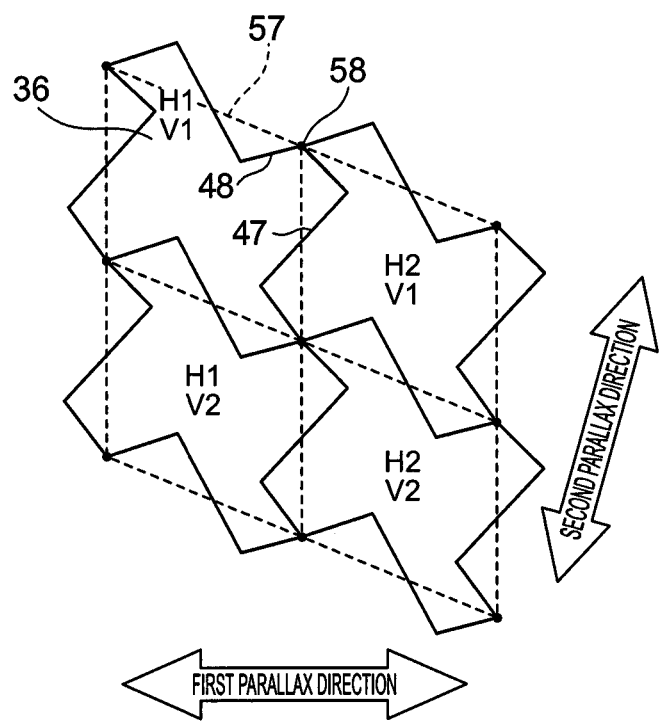
FIG. 15B is an explanatory chart showing the sub-pixels to which the rhombic lattice shown in FIG. 13C is applied.

FIG. 15 shows explanatory charts regarding sub-pixels 35 and 36 to which the rectangular lattice 55 and the rhombic lattice 57 shown in FIG. 13B to FIG. 13C are employed. FIG. 15A shows the sub-pixel 35 to which the rectangular lattice 55 is employed. FIG. 15B shows the sub-pixel 36 to which the rhombic lattice 57 is employed. The shapes of both of the sub-pixels 35 and 36 are the same as those of the first exemplary embodiment.

In both cases, the square lattice point 54 that is the intersection point between the first non-control region 41 (45, 47) and the second non-control region 42 (46, 48) in the first exemplary embodiment is simply replaced with the rectangular lattice point 56 or the rhombic lattice point 58. FIG. 14A and FIG. 14B both show the shape of "twice-bending". However, this shape may naturally be changed to the shape of "once-bending" described already in the first exemplary embodiment or other shapes.

Figure 16:
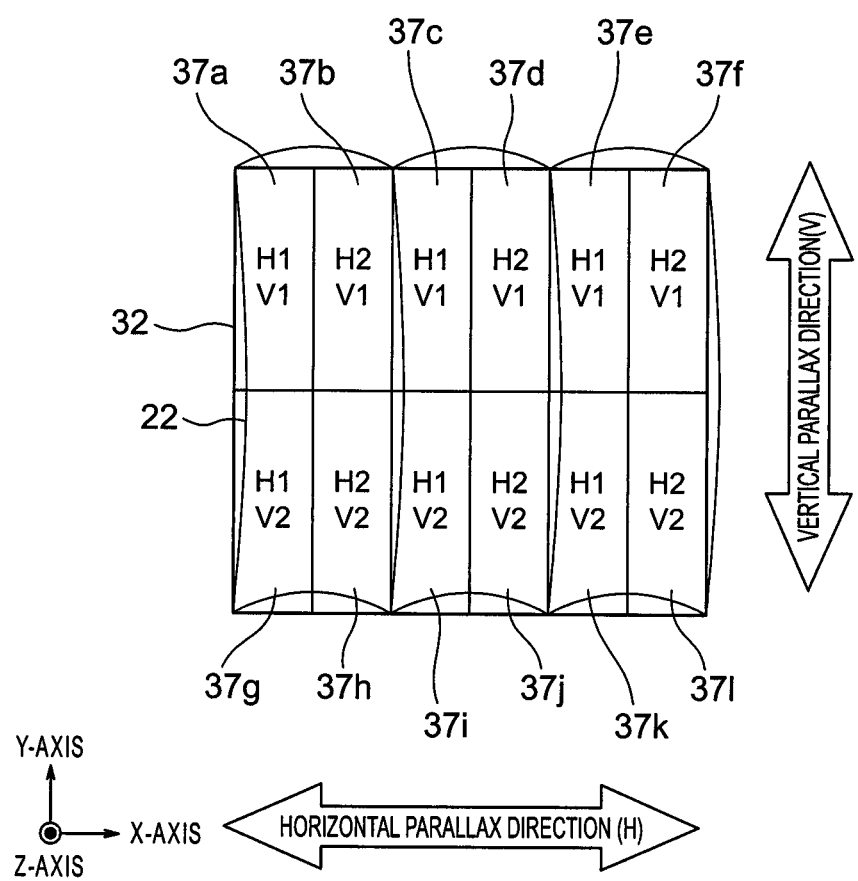
FIG. 16 is an explanatory chart showing an example of the layout of the sub-pixels to which the rectangular lattice shown in FIG. 13B

FIG. 16 is an explanatory chart showing an example of the layout of sub-pixels 35 to which the rectangular lattice 55 shown in FIG. 13B and FIG. 15A is employed and the lens array 121. The display panel 112 is constituted with a great number of vertical-stripe form pixels 37 that are arranged in a rectangular lattice form. The pixel 37 is constituted with four sub-pixels 37a, 37b, 37c, and 37d (same as the sub-pixel 35 shown in FIG. 15A) which are arranged in a form of 2×2.

The lens array 121 is constituted with a great number of lens elements that are disposed in a lattice form. Further, each lens element is located at a position and in a size corresponding to each pixel of the display panel 112. Here, a lens element 122 of the lens array 121 is disposed by corresponding to a pixel 132 of the display panel 112.

The structures of the pixel 132 and the lens element 122 conform to those of the first exemplary embodiment shown in FIG. 2, respectively. However, the pixel 132 and the lens element 122 are both formed in a rectangular shape.

When defining 37a, 37d, 37g, and 37j as red pixels, 37b, 37e, 37h, and 37k as green pixels, and 37c, 37f, 37i, and 37l as blue pixels, in the sub-pixel layout example, the layout is the same as a typical pixel group in which colors are arranged in a vertical-stripe layout.

With such structures, it is possible to acquire the effect of suppressing generation of the 3D moiré and the 3D crosstalk in both directions of the first parallax direction and the second parallax direction like the effects of the first exemplary embodiment described above by applying the second exemplary embodiment also to the display panel having the typical vertical stripe layout.

Third Exemplary Embodiment

A stereoscopic image display device 210 according to a third exemplary embodiment of the present invention includes first and second non-control regions which are different from those of the first exemplary embodiment. That is, it is structured in such a manner that: one of the first and second non-control regions is bent once in two unit lattices formed by lattice lines that are segments disposed vertically and at an equivalent pitch for the first direction and the second direction, respectively; the other one of the first and the second non-control regions is bent at least once within the unit lattice; and the intersection part of the first and the second non-control regions does not exist on two points out of the four lattice points of the unit lattice.

With the above-described structures, the same effects as those of the first exemplary embodiment can be acquired as well.

This will be described in details hereinafter.

FIG. 17 is an explanatory chart showing the structure of the stereoscopic image display device 210 according to the third exemplary embodiment of the present invention. The stereoscopic image display device 210 includes a display panel 212 to be described later and the lens array 21 same as that of the first exemplary embodiment which is an optical module disposed on the front face of the display panel 212. The structure of the display panel 212 is equivalent to those of the first and second exemplary embodiments, but shape thereof is different from that of the first exemplary embodiment.

That is, the display panel 212 is structured by disposing each of the sub-pixels on the square lattice as in the case of the first exemplary embodiment. However, while the first non-control region and the second non-control region are bent at least once within the unit lattice and all the intersection parts are in the structure where the non-control regions exist on the square lattice points (or the rectangular lattice points or the rhombic lattice points) in the first and second exemplary embodiments, the third exemplary embodiment employs the structure in which either the first non-control region or the second non-control region is bent once within the unit lattice and the other non-control region is bent at least once within the unit lattice. With this structure, it is also possible to achieve the exemplary object of the present invention described above. This will be described hereinafter.

Figure 18A:
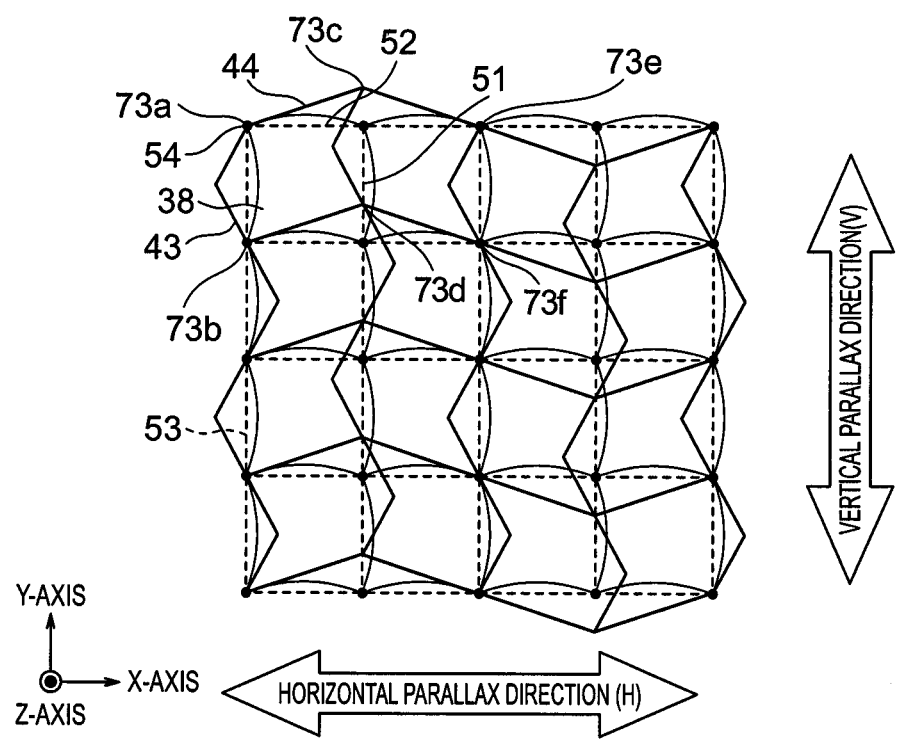
FIG. 18A is an explanatory chart showing the layout of each of the sub-pixels of the display panel shown in FIG. 17.
Figure 18B:
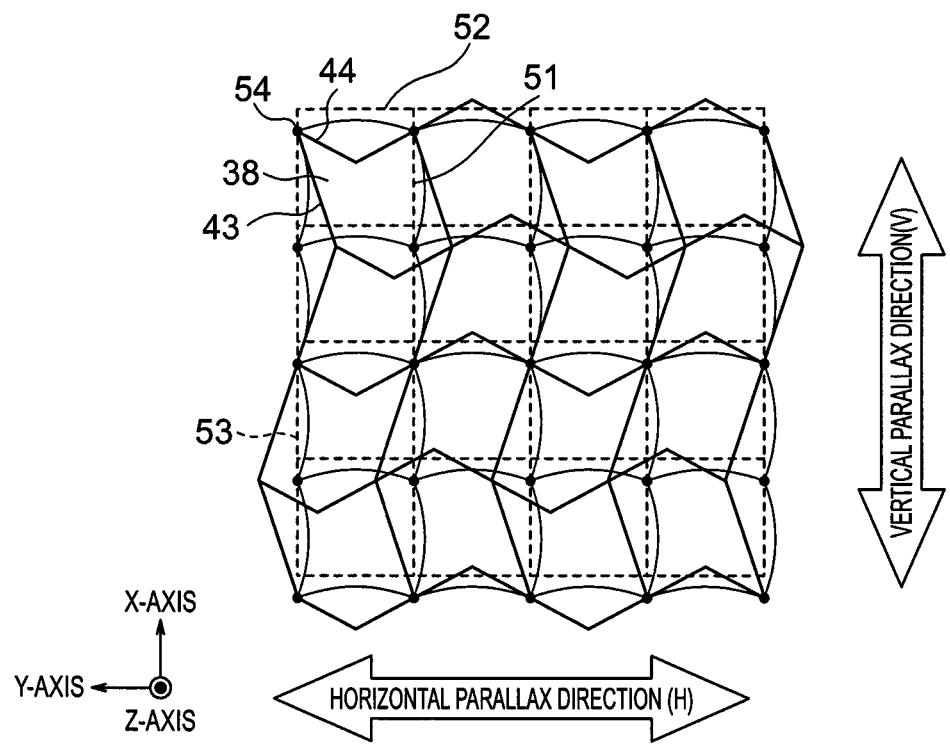
FIG. 18B is an explanatory chart showing the layout of a case where the XY-axes are rotated counterclockwise by 90 degrees with respect to the Z-axis regarding the sub-pixels shown in FIG. 18A.

FIG. 18A is an explanatory chart showing the layout of each of the sub-pixels 38 on the display panel 212 shown in FIG. 17. FIG. 18B is an explanatory chart showing the layout of a case where XY-axes of the sub-pixels 38 shown in FIG. 18A are rotated counterclockwise by 90 degrees with respect to the Z-axis. A first non-control region 43 is bent once for a single square lattice, and a second non-control region 44 is bent once for two square lattices.

In this case, intersection parts 73a and 73b are disposed on the square lattice points, intersection parts 73c and 73d are not disposed on the square lattice points, and intersection parts 73e and 73f are disposed on the square lattice points. As described, it can be seen that the intersection parts not disposed on the square lattice points exist in two periods of the first lattice line for the X-axis on the second square lattice lines including the intersection parts 73a, 73c, and 73e.

Similarly, on the Y-axis, all the intersection parts are disposed on the square lattice points on the first lattice lines including the intersection parts 73a and 73b. In the meantime, none of the intersection parts is disposed on the square lattice points on the first lattice lines including the intersection parts 73c and 73d.

That is, such first square lattice line where none of the intersection parts are disposed on the square lattice points exists in two periods for the X-axis. With such structure, it is possible to suppress generation of the 3D moiré and the 3D crosstalk in both of the horizontal and vertical directions. Note that the first non-control region 43 with bending of once or more for a single square lattice as shown in FIG. 6 can be employed without a problem.

A method for checking whether or not actually the intersection part of the first and second non-control regions exists on the lattice point or the lattice circle is as follows. First, the intersection parts of the first and the second non-control regions are plotted. Then, the first and second lattice lines that are vertical segments for the first and second directions for separating the light rays are drawn by including the plotted points, and the lattice points at which the lattice lines intersect and the unit lattice are acquired. When there are two points where the lattice points and the intersection parts overlapped with each other within the unit lattice, it is confirmed that the structure of the present invention is employed. Further, the lattice point may be within the diameter range of 0.1 with respect to the length of one side of the unit lattice.

Fourth Exemplary Embodiment

A stereoscopic image display device 310 according to a fourth exemplary embodiment of the present invention is acquired by further expanding the first exemplary embodiment, in which a pixel is constituted with M×N pieces of sub-pixels when the number of viewpoints in the first direction is defined as N and the number of viewpoints in the second direction is M (M and N are integers of 2 or larger).

With the above-described structure, the same effects as those of the first exemplary embodiment can be acquired even when the number of viewpoints is increased further.

This will be described in details hereinafter.

FIG. 19 is an explanatory chart showing the structure of the stereoscopic image display device 310 according to the fourth exemplary embodiment of the present invention. The stereoscopic image display device 310 includes a display panel 312 to be described later and a lens array 321 that is an optical module disposed on the front face of the display panel 312. The structures of the display panel 312 and the lens array 321 are equivalent to those of the first exemplary embodiment, but shapes of each of those are different from those of the first exemplary embodiment.

That is, the display panel 312 in this exemplary embodiment is structured with pixels each constituted with 4×4 sub-pixels, while each pixel disposed on the square lattice is constituted with 2×2 sub-pixels in the first exemplary embodiment. This will be described hereinafter.

Figure 20:
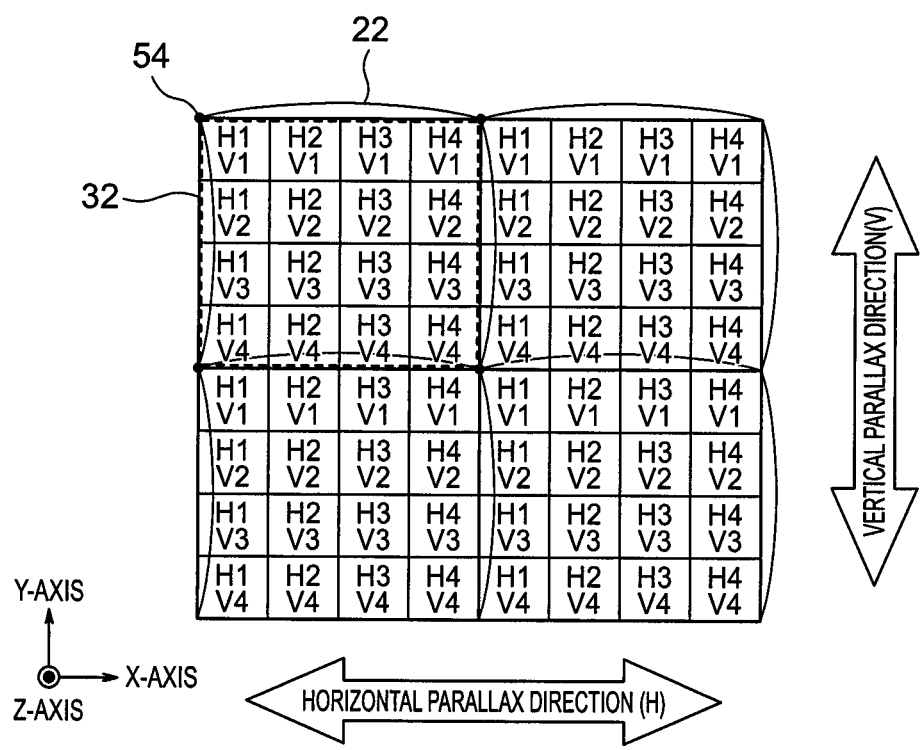
FIG. 20 is an explanatory chart showing a layout example of sub-pixels which constitute a display panel shown in FIG. 19 and lens elements which constitute a lens array.

FIG. 20 is an explanatory chart showing an example of the layout of pixels 332 which constitute the display panel 312 and lens elements 322 which constitute the lens array 321 shown in FIG. 19. The pixel 332 is constituted with sixteen sub-pixels 331a to 331p which are arranged in a form of 4×4. The lens array 321 is constituted by disposing a great number of lens elements 322 in a lattice form.

Further, each lens element is located at a position and in a size corresponding to each pixel of the display panel 312. Here, the lens element 322 of the lens array 321 is disposed by corresponding to the pixel 332 of the display panel 312. This is the unit pixel at the time of stereoscopic display.

In FIG. 20, as in the case of FIG. 2, the sub-pixel corresponding to the image 1 in the horizontal direction is expressed as "H1", the sub-pixel corresponding to the image 2 is expressed as "H2", the sub-pixel corresponding to the image 3 is expressed as "H3", and the sub-pixel corresponding to the image 4 is expressed as "H4". Similarly, in the vertical direction, the sub-pixel corresponding to the image 5 is expressed as "V1", the sub-pixel corresponding to the image 6 is expressed as "V2", the sub-pixel corresponding to the image 7 is expressed as "V3", and the sub-pixel corresponding to the image 8 is expressed as "V4".

With such structure, it is possible to employ the relation between the intersection parts of the non-control regions of the sub-pixels and the lattice points 54 and the bending structure of the non-control regions with respect to the lattice lines shown in the first to third exemplary embodiments. That is, this makes it possible to provide the stereoscopic image display device which is capable of suppressing the 3D moiré for the multi-viewpoints by making the density of the sub-pixels separating the image to the horizontal direction and the vertical direction uniform, i.e., by making the horizontal and vertical resolution uniform.

Figure 21A:
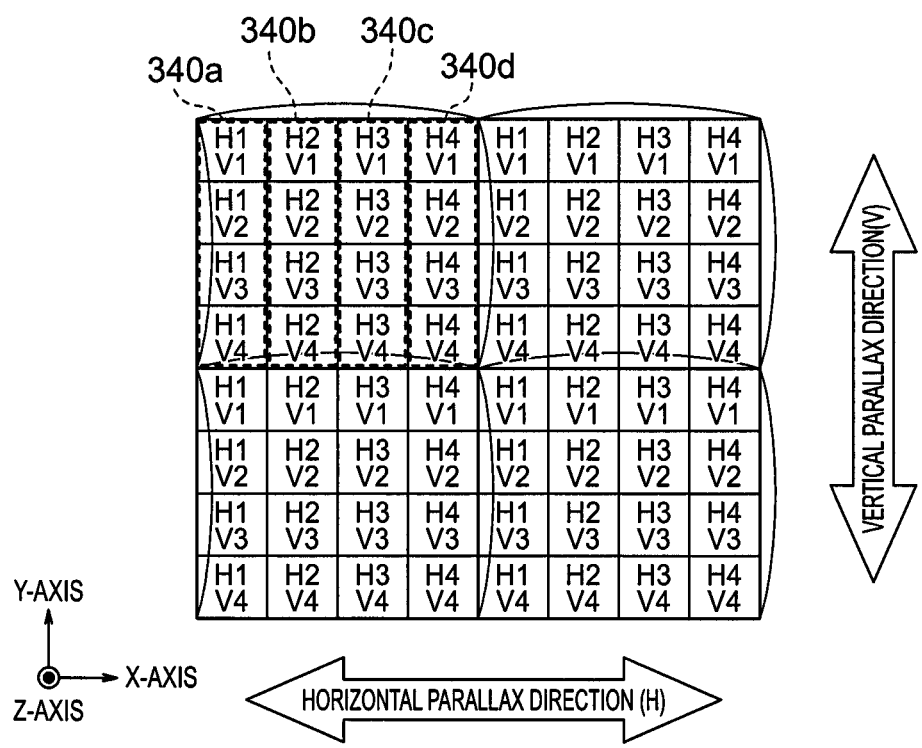
FIG. 21A is an explanatory chart showing a display example (light ray separation only in one direction) which specifically displays stereoscopic images for multiple viewpoints with the stereoscopic image display device shown in FIG. 19 to FIG. 20.
Figure 21B:
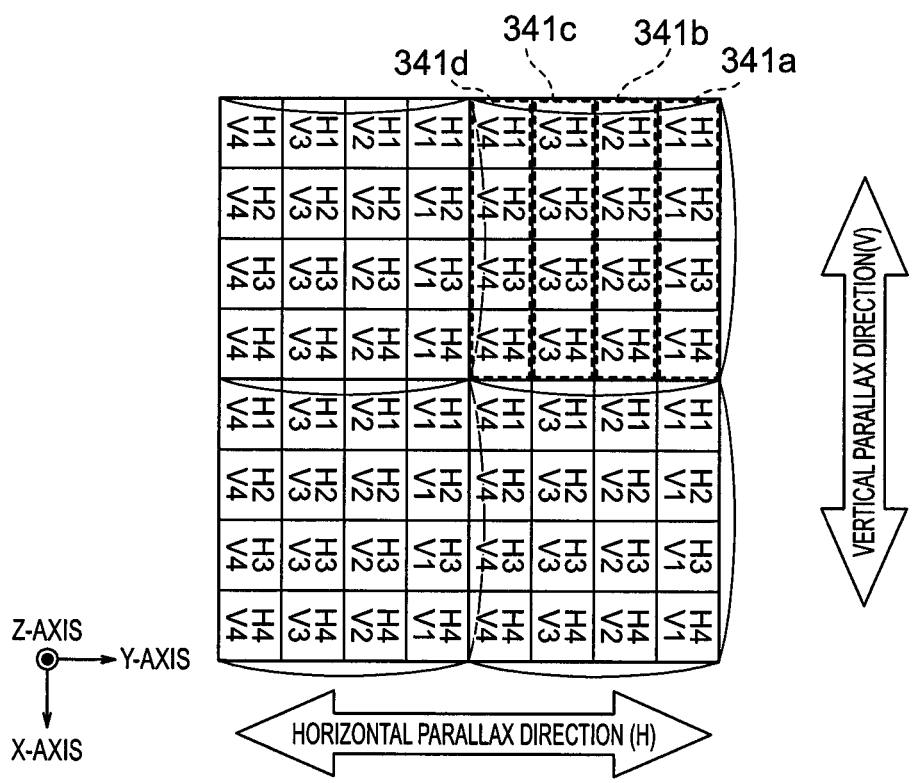
FIG. 21B is an explanatory chart showing a display example (light ray separation only in one direction) which specifically displays stereoscopic images for multiple viewpoints with the stereoscopic image display device shown in FIG. 19 to FIG. 20.
Figure 21C:
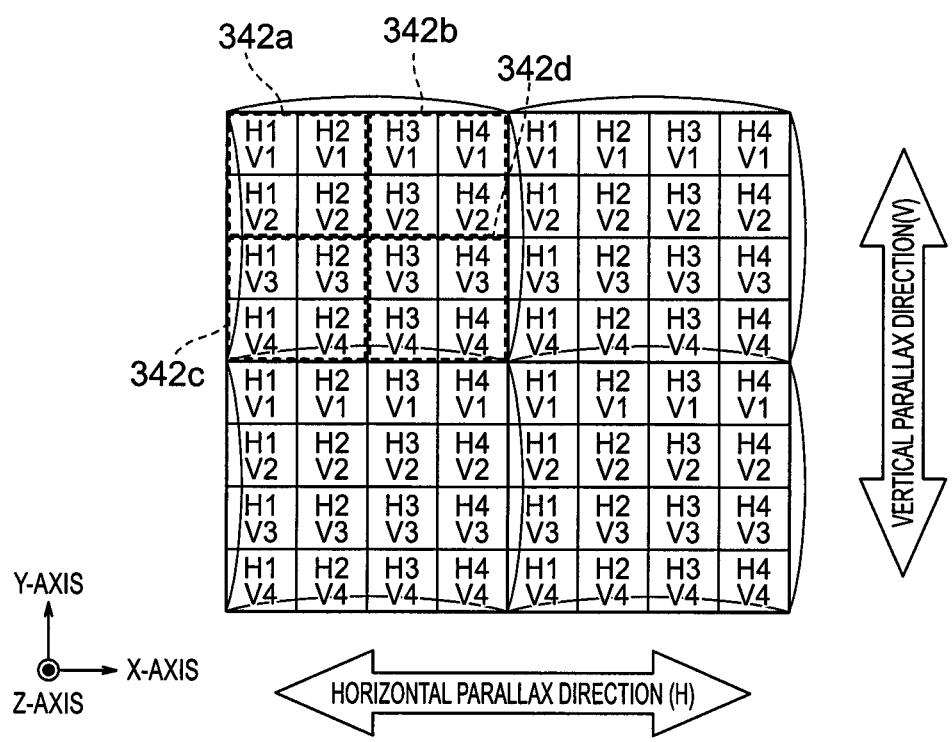
FIG. 21C is an explanatory chart showing a display example (light ray separation in two directions) which specifically displays stereoscopic images for multiple viewpoints with the stereoscopic image display device shown in FIG. 19 to FIG. 20.

FIGS. 21A to 21C are explanatory charts showing display examples when displaying stereoscopic images for the multi-viewpoints specifically by the stereoscopic image display device 310 shown in FIG. 19 to FIG. 20. FIGS. 21A and 21B show light ray separation only in one direction out of the horizontal and vertical directions, and FIG. 21C shows a display example of light ray separation for both the horizontal and vertical directions. Here, a fly-eye lens is illustrated to be used as a unit lens constituting the lens element 322. Other than that, with a parallax barrier or a GRIN lens by an active element using liquid crystal or the like, it is possible to select light separation in two directions simultaneously or light ray separation only in one direction. Thus, those are preferable for a case where controls of FIGS. 21A to 21C is executed by the same structure.

FIG. 21A shows a case of achieving stereopsis of four viewpoints in the horizontal direction by using each of four-viewpoint images (first to fourth images) having parallax only in the horizontal direction, in which signals corresponding to the first image are inputted to a sub-pixel group 340a (sub-pixels 331a, e, i, m), signals corresponding to the second image are inputted to a sub-pixel group 340b (sub-pixels 331b, f, j, n), signals corresponding to the third image are inputted to a sub-pixel group 340c (sub-pixels 331c, g, k, o), signals corresponding to the fourth image are inputted to a sub-pixel group 340d (sub-pixels 331d, h, l, p), and light ray separation is performed only in the horizontal direction of the X-axis.

FIG. 21B shows a form which is acquired by rotating FIG. 21A by 90 degrees in a clockwise direction. Signals corresponding to the first image are inputted to a sub-pixel group 341a (sub-pixels 331a, b, c, d), signals corresponding to the second image are inputted to a sub-pixel group 341b (sub-pixels 331e, f, g, h), signals corresponding to the third image are inputted to a sub-pixel group 341c (sub-pixels 331i, j, k, l), signals corresponding to the fourth image are inputted to a sub-pixel group 341d (sub-pixels 331m, n, o, p), and light ray separation is performed only in the horizontal direction of the Y-axis to achieve stereopsis of four viewpoints in the horizontal direction.

FIG. 21C shows a case of achieving stereopsis of two viewpoints each in the horizontal direction and the vertical direction by using each of four-viewpoint images (fifth to eighth images) having parallax in the horizontal direction and the vertical direction, in which signals corresponding to the fifth image are inputted to a sub-pixel group 342a (sub-pixels 331a, b, e, f), signals corresponding to the sixth image are inputted to a sub-pixel group 342b (sub-pixels 331c, d, g, h), signals corresponding to the seventh image are inputted to a sub-pixel group 342c (sub-pixels 331i j, m, n), signals corresponding to the eighth image are inputted to a sub-pixel group 342d (sub-pixels 331k, l, o, p), and light ray separation is performed in the horizontal direction of the X-axis and the vertical direction of the Y-axis.

Figure 22:
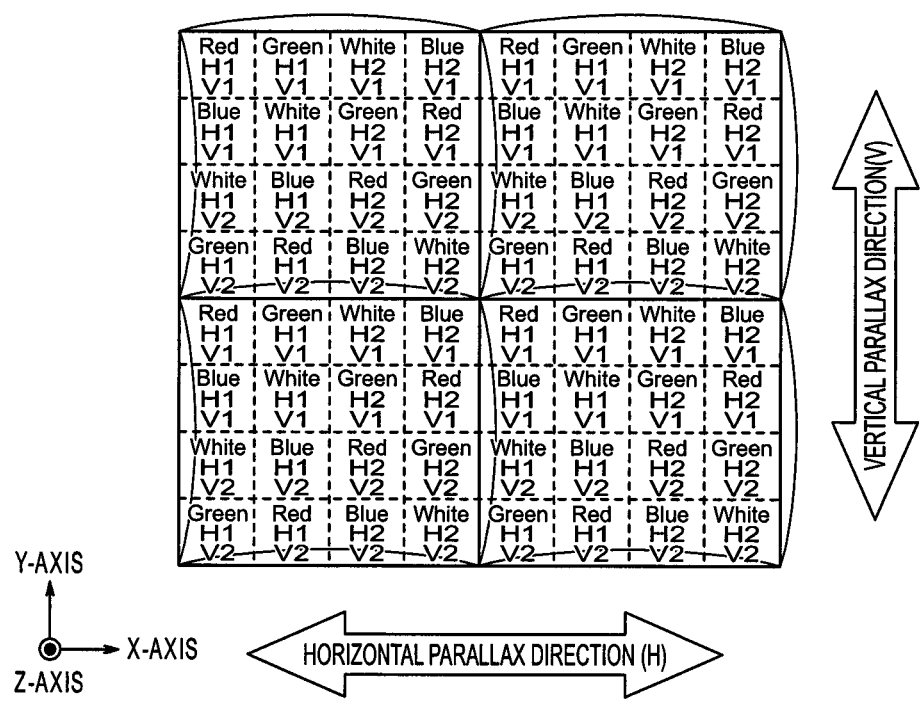
FIG. 22 is an explanatory chart showing an example of the layout of the colors for each of the sub-pixels in the stereoscopic image display device shown in FIG. 19 to FIG. 20.

FIG. 22 is an explanatory chart showing an example of color layout for each of the sub-pixels 331 on the stereoscopic image display device shown in FIG. 19 to FIG. 20. In this example, four primary colors of RGBW are arranged for each of the sub-pixels 331. Other than that, it is also possible to arrange arbitrary four colors such as RGBY, CMYK, or CMYW. By applying this example to FIGS. 20A to 20C, it is possible to constitute each of the sub-pixel groups 341 with the four colors of RGBW at all times.

The use of such color layout makes it possible to provide a stereoscopic image display device with which: light ray separation can be done in one direction and two directions also for the multi-viewpoints only with the image signals and the signals of the optical module; the horizontal resolution and the vertical resolution can be made uniform; generation of the 3D moiré can be suppressed; and the color 3D moiré is not generated.

Figure 23:
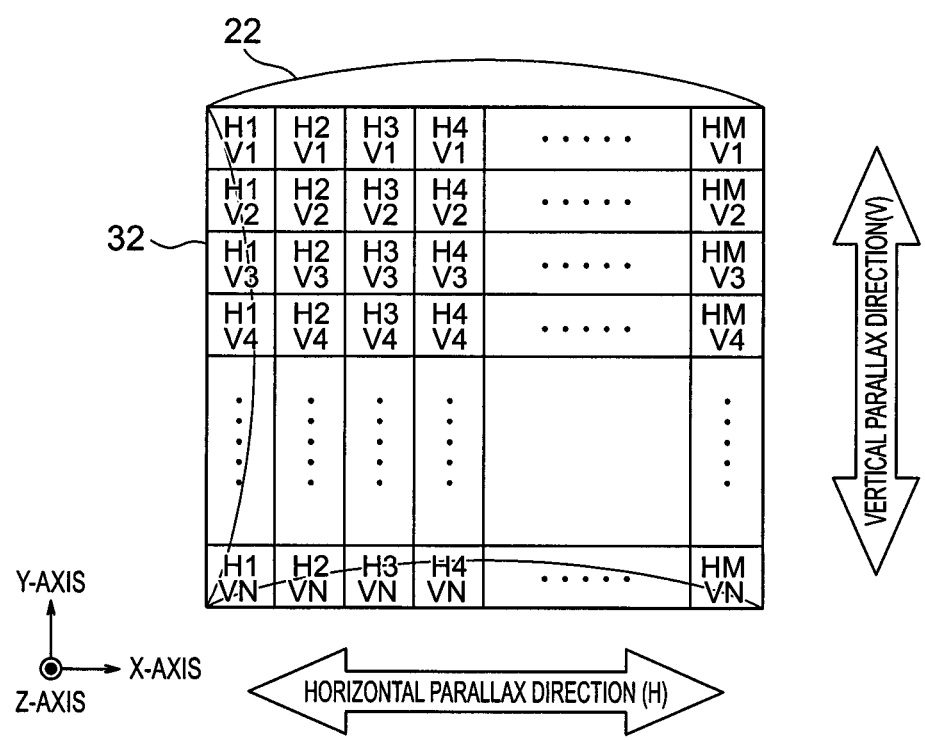
FIG. 23 is an explanatory chart showing an expanded example in which each pixel is constituted with arbitrary M×N sub-pixels in the stereoscopic image display device shown in FIG. 18 to FIG. 20.

Naturally, this structure is not limited to the case where each pixel is constituted with 4×4 sub-pixels but can be expanded to a pixel constituted with arbitrary N×M sub-pixels. FIG. 23 is an explanatory chart showing an expanded example of the stereoscopic image display device 310 shown in FIG. 18 to FIG. 20 where each pixel is constituted with arbitrary N×M sub-pixels. As in FIG. 20 to FIG. 21, FIG. 23 shows a layout example of the pixels 332 constituting the display panel 312 and the lens element 322 constituting the lens array 321.

This is the same as the example of "4×4" shown in FIG. 18 to FIG. 20, except that there are M-viewpoints in the horizontal direction and N-viewpoints in the vertical direction. By setting N=M, the same-number parallax can be achieved in the horizontal direction and the vertical direction. Further, by setting N as a multiple of the number of primary colors, it is possible to suppress the color breakup and the 3D moiré generated when light-ray separation in one direction and two directions is done only with the image signals and the signals of the optical module.

Fifth Exemplary Embodiment

In a stereoscopic image display device 410 according to a fifth exemplary embodiment of the present invention, a light-shielding pattern existing within the aperture part of the sub-pixel excluding the first and the second non-control regions is formed with segments in parallel to the first and second non-control regions. Further, the light-shielding pattern is a signal line, a switching element, a contact hole, or a source electrode. Furthermore, the non-control region is constituted with a signal line, a partition wall, or a black matrix.

With the above-described structure, the same effects as those of the first exemplary embodiment can be acquired even with a transmission-type LCD, a bottom emission type organic EL, and the like.

This will be described in details hereinafter.

Figure 24:
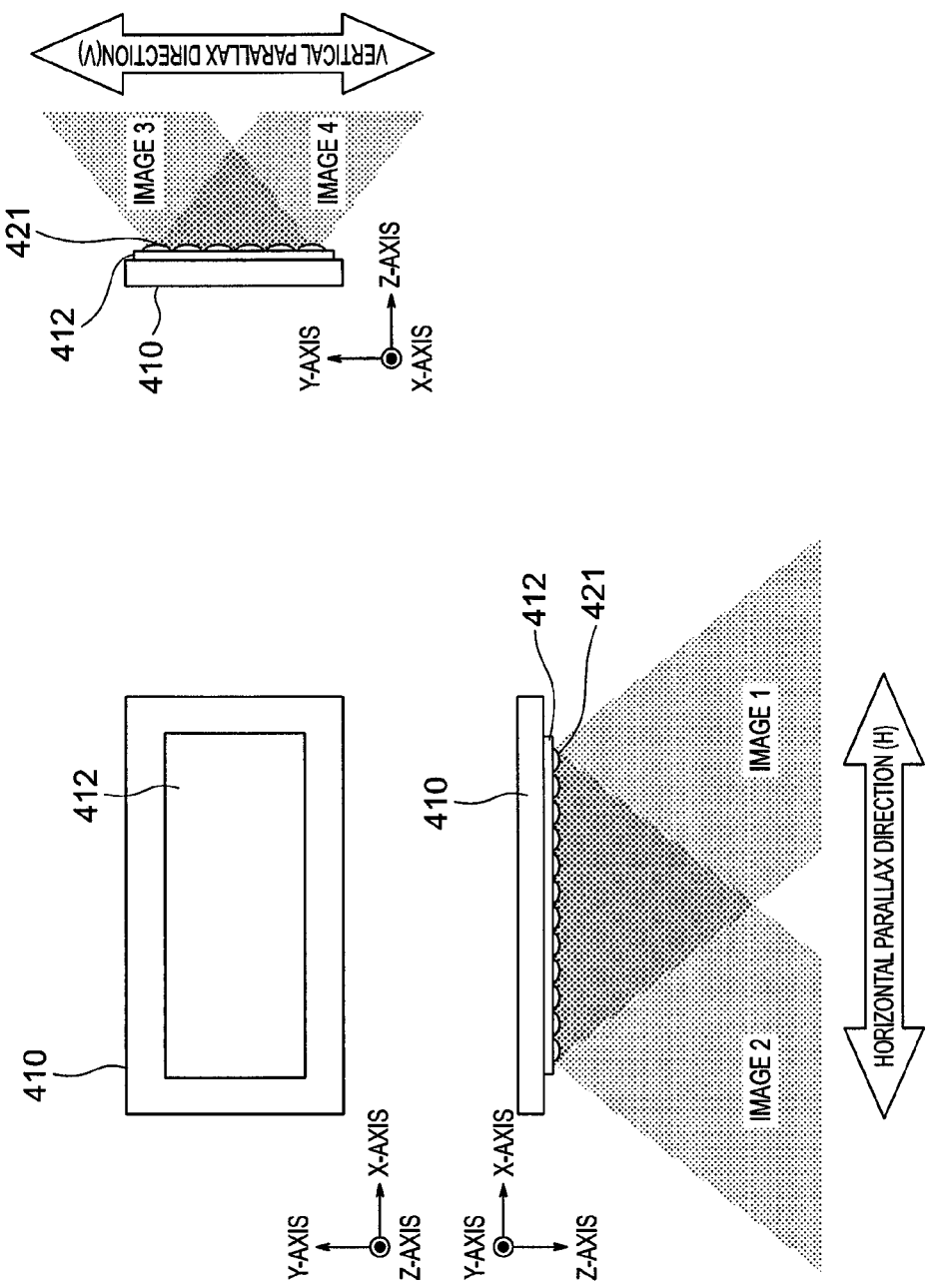
FIG. 24 is an explanatory chart showing the structure of a stereoscopic image display device according to a fifth exemplary embodiment of the present invention.

FIG. 24 is an explanatory chart showing the structure of the stereoscopic image display device 410 according to the fifth exemplary embodiment of the present invention. The stereoscopic image display device 410 includes a display panel 412 to be described later and a lens array 421 that is an optical module disposed on the front face of the display panel 412. The structures of the display panel 412 and the lens array 421 are equivalent to those of the first exemplary embodiment.

In the first to fourth exemplary embodiments described above, the emission pattern of the sub-pixel, i.e., the aperture part, is defined as the region other than the first and second non-control regions described above. This depends on the type of the electro-optic element of the display panel. However, a reflection type LCD, an electrophoretic element, or a top emission type organic EL is not so susceptible to the influence of the switching element and the signal wiring. Thus, the above-described concept as it is can be simply applied thereto, and there is no specific problem raised when paying attention only to the patterns of the first and second non-control regions.

However, in cases of a transmission type LCD or a bottom emission type organic EL, the exit light is shielded due to the influence of the switching element and the signal wiring. Thus, the above-described content cannot be simply applied regarding the aperture part of the sub-pixel. Thus, the pattern of the aperture part is changed. The fifth exemplary embodiment is designed to make it possible to apply the same concept as those of the first to fourth exemplary embodiments described above in the case described above not only for the patterns of the first and second non-control regions but also for the switching element and the signal wiring. This will be described hereinafter.

Figure 25:
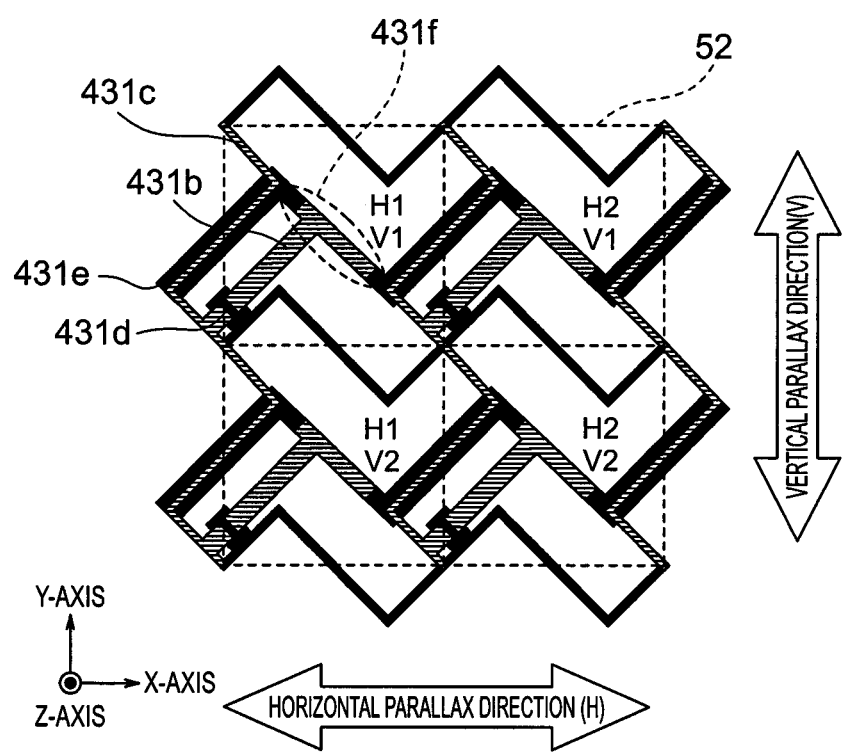
FIG. 25 is an explanatory chart showing a structural example of switching elements and signal wirings of the sub-pixels constituting a display panel shown in FIG. 24.

FIG. 25 is an explanatory chart showing a structural example of the switching element and the signal wiring in a sub-pixel 431 which constitutes the display panel 412 shown in FIG. 24. In the sub-pixel 431, a source electrode 431b and a data signal line 431c are connected via a switching element 431a. Through inputting a prescribed gate signal from a gate signal line 431d, a prescribed potential is written to the source electrode 431b from the data signal line 431c. A storage 431f is formed through capacitively coupling a storage wiring 431e and the source electrode 431b via an insulating film.

While the gate signal line 431d and the data signal line 431c are considered to correspond to the first and second non-control regions described above, the storage wiring 431e does not correspond to the first and second non-control regions described above. Through bending such storage wiring 431e with respect to the second lattice line 52 substantially in parallel to the gate signal line 431d that is the non-control region, it is possible to acquire the effect of suppressing the 3D moiré phenomenon same as that of the first exemplary embodiment.

Regarding the switching element 431a and the source electrode 431b, it is desirable to form those substantially in parallel to the data signal line 431c or the gate signal line 431d.

Figure 26:
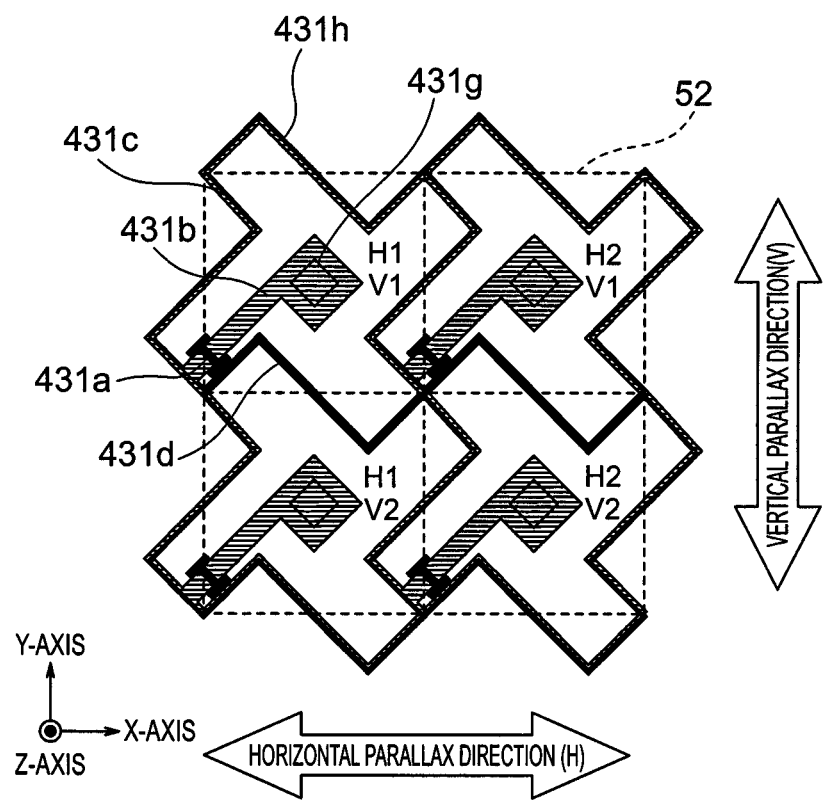
FIG. 26 is an explanatory chart showing another structural example of the switching elements and the signal wirings of the sub-pixels constituting the display panel shown in FIG. 24.

FIG. 26 is an explanatory chart showing another structural example of the switching element and the signal wiring in the sub-pixel 431 which constitutes the display panel 412 shown in FIG. 24. In this example, the source electrode 431b is connected to the pixel electrode 431h via a contact hole 431g. In this case, it is desirable to form the switching element 431a, the source electrode 431b and the contact hole 431g substantially in parallel to the gate signal line 431d or the data signal line 431c.

Note, however, that it is preferable in the wiring examples illustrated in FIG. 24 and FIG. 25 to employ the patterns of the non-control regions such as the switching element and the signal wiring by considering the size effect. For example, the storage wiring in FIG. 21 is continuously formed on the entire surface of the display panel by going through the sub-pixels, so that the same influence as that of the non-control region is imposed regarding the 3D moiré phenomenon. Therefore, it is required to form the storage wiring to be substantially in parallel to the data signal line or the gate signal line.

In the meantime, regarding the switching element, the source electrode, and the contact hole shown in FIG. 24 and FIG. 25, it is possible to determine whether or not to form those substantially in parallel to the data signal line or the gate signal line by considering a balance between the size of the unit lattice and the size of the pattern. With the subjective evaluation done by the inventors of the present invention, it is confirmed to be permissible regarding the 3D moiré without forming those substantially in parallel to the data signal line or the gate signal line when the size of the pattern is equal to or smaller than 0.2 that is the size of the unit lattice.

When the patterns of the switching element, the source electrode, and the contact hole are extremely smaller with respect to the unit lattice, it is not essential to form those substantially in parallel to the data signal line 431c or the gate signal line 431d.

Expansion of Exemplary Embodiments

Each of the exemplary embodiments above is described as the stereoscopic image display device. However, the 3D moiré that is the object to be overcome with the exemplary embodiments is not limited only to the stereoscopic image display device. For example, the 3D moiré may be generated in a display device which displays different images for a plurality of observing positions by using an optical module that gives the directivity to the light rays, such as a car navigation device which displays different images for the driver seat and the passenger seat, respectively. It is also possible to suppress the 3D moiré by employing the techniques of the exemplary embodiments for such display device.

While the present invention has been described by referring to the specific exemplary embodiments illustrated in the drawings, the present invention is not limited to those exemplary embodiments illustrated in the drawings. Any other known structures can be employed, as long as the effects of the present invention can be achieved therewith.

While a part of or a whole part of the exemplary embodiments described above can be summarized as follows, the present invention is not limited only to the following structures.

(Supplementary Note 1)

A stereoscopic image display device capable of providing bidirectional stereoscopic image display which displays parallax images for at least two viewpoints each simultaneously for a first direction and a second direction and unidirectional stereoscopic image display which displays parallax images for at least two viewpoints each for either the first direction or the second direction, the stereoscopic image display device including:

a display panel in which pixels each constituted with a plurality of sub-pixels that are formed with electro-optic elements by corresponding to the parallax images are arranged in matrix; and an optical module which distributes light emitted from the pixels arranged in the first direction to different directions from each other along the first direction and distributes light emitted from the pixels arranged in the second direction to different directions from each other along the second direction, wherein:

the display panel includes first and second non-control regions which are regions existing between boundaries of apertures of the sub-pixels where controls of electro-optic conversion cannot be done;

the first non-control region is extended along the first direction, and the second non-control region is extended along the second direction, respectively; and an intersection part of the first and the second non-control regions is disposed on a lattice point that is an intersection point of segments in a unit lattice that is constituted with lattice lines that are the segments disposed vertically and at an equivalent pitch, respectively, for the first direction and the second direction, and the first and the second non-control regions are bent at least once within the unit lattice with respect to the lattice lines.

(Supplementary Note 2)

A stereoscopic image display device capable of providing bidirectional stereoscopic image display which displays parallax images for at least two viewpoints each simultaneously for a first direction and a second direction and unidirectional stereoscopic image display which displays parallax images for at least two viewpoints each for either the first direction or the second direction, the stereoscopic image display device including:

a display panel in which pixels each constituted with a plurality of sub-pixels that are formed with electro-optic elements by corresponding to the parallax images are arranged in matrix; and an optical module which distributes light emitted from the pixels arranged in the first direction to different directions from each other along the first direction and distributes light emitted from the pixels arranged in the second direction to different directions from each other along the second direction, wherein:

the display panel includes first and second non-control regions which are regions existing between boundaries of apertures of the sub-pixels where controls of electro-optic conversion cannot be done;

the first non-control region is extended along the first direction, and the second non-control region is extended along the second direction, respectively; and one of the first and the second non-control regions is bent once in two lattice units constituted with lattice lines that are segments disposed vertically and at an equivalent pitch for the first direction and the second direction, respectively, the other one of the first and second non-control regions is bent at least once within the lattice unit, and intersection part of the first and the second non-control regions does not exist on two points out of four lattice points of the unit lattice.

(Supplementary Note 3)

The stereoscopic image display device as depicted in Supplementary Note 1 or 2, wherein the first direction and the second direction are orthogonal to each other.

(Supplementary Note 4)

The stereoscopic image display device as depicted in Supplementary Note 1, wherein numbers of bending in the first and second non-control regions within the unit lattice with respect to the lattice line are same.

(Supplementary Note 5)

The stereoscopic image display device as depicted in Supplementary Note 1, 3, or 4, wherein the number of bending is "1", and an angle formed between bent parts of the first and second non-control regions and the lattice line is 18 to 62 degrees.

(Supplementary Note 6)

The stereoscopic image display device as depicted in Supplementary Note 1, 3, or 4, wherein the number of bending is "2", and an angle formed between bent parts of the first and second non-control regions and the lattice line is 38 to 82 degrees.

(Supplementary Note 7)

The stereoscopic image display device as depicted in any one of Supplementary Notes 1 to 6, wherein in a case where a direction in parallel to a line connecting a left eye and a right eye of an observer is defined as a horizontal direction, a direction from the left eye to the right eye is defined as a positive direction, the second direction is aligned with the horizontal direction, a plurality of points of bending are provided on both sides of the lattice line with respect to the lattice line that is orthogonal to the horizontal direction, and the positive direction is defined as a right side while a negative direction is defined as a left side, an area of a first polygon formed on the right side and an area of a second polygon formed on the left side between the lattice line and the first non-control region are equivalent.

(Supplementary Note 8)

The stereoscopic image display device as depicted in any one of Supplementary Notes 1 to 6, wherein in a case where a direction in parallel to a line connecting a left eye and a right eye of an observer is defined as a horizontal direction, a direction from the left eye to the right eye is defined as a positive direction, the second direction is aligned with the horizontal direction, a plurality of points of bending are provided on both sides of the lattice line with respect to the lattice line in the second direction that is the horizontal direction, and the positive direction is defined as an upper side while a negative direction is defined as a lower side, an area of a first polygon formed on the upper side and an area of a second polygon formed on the lower side between the lattice line and the second non-control region are equivalent.

(Supplementary Note 9)

The stereoscopic image display device as depicted in any one of Supplementary Notes 1 to 6, wherein in a case where a direction in parallel to a line connecting a left eye and a right eye of an observer is defined as a horizontal direction, a direction from the left eye to the right eye is defined as a positive direction, the second direction is aligned with the horizontal direction, and the positive direction is defined as a right side while a negative direction is defined as a left side with respect to the lattice line that is orthogonal to the horizontal direction, an area of a first polygon formed on the right side and an area of a second polygon formed on the left side between the lattice line orthogonal to the horizontal direction and the first non-control region, and an area of a third polygon formed on an upper side and an area of a fourth polygon formed on a lower side between the lattice line in parallel to the horizontal direction and the second non-control region, are all equivalent.

(Supplementary Note 10)

The stereoscopic image display device as depicted in any one of Supplementary Notes 7 to 9, wherein each of the polygons formed between the lattice line orthogonal to the horizontal direction and the first non-control region or between the lattice line in parallel to the horizontal direction and the second non-control region is a triangle.

(Supplementary Note 11)

The stereoscopic image display device as depicted in any one of Supplementary Notes 1 to 10, wherein in a case where length of the lattice line within the unit lattice is defined as P, diameter of a lattice circle formed by having the lattice point as a center is defined as D, and a normalized diameter is defined as D/P, the intersection part of the first and the second non-control regions is disposed within the lattice circle with the normalized diameter of 0.1 or smaller.

(Supplementary Note 12)

The stereoscopic image display device as depicted in any one of Supplementary Notes 1 to 11, wherein in a case where number of viewpoints in the first direction is defined as N and number of viewpoints in the second direction is defined as M (N and M are both integers of 2 or larger), the pixel is constituted with N×M pieces of sub-pixels.

(Supplementary Note 13)

The stereoscopic image display device as depicted in any one of Supplementary Notes 1 to 12, wherein width of the first non-control region and width of the second non-control region are different.

(Supplementary Note 14)

The stereoscopic image display device as depicted in any one of Supplementary Notes 1 to 12, wherein width of the first non-control region or the second non-control region changes continuously by corresponding to positions in the second direction or the first direction of the non-control region.

(Supplementary Note 15)

The stereoscopic image display device as depicted in any one of Supplementary Notes 1 to 12, wherein width of the first non-control region or the second non-control region changes discontinuously by corresponding to positions in the second direction or the first direction of the non-control region between a first bent part or a unit lattice point and a second bent point neighboring to the first bent point or the unit lattice point in the first direction or the second direction of the first non-control region or the second non-control region.

(Supplementary Note 16)

The stereoscopic image display device as depicted in Supplementary Note 12, wherein N equals to the M.

(Supplementary Note 17)

The stereoscopic image display device as depicted in any one of Supplementary Notes 1 to 16, wherein a light-shield pattern existing within the aperture part of the sub-pixel is formed with segments in parallel to the first and the second non-control regions.

(Supplementary Note 18)

The stereoscopic image display device as depicted in Supplementary Note 17, wherein the light-shield pattern is a signal line, a switching element, a contact hole, or a source electrode.

(Supplementary Note 19)

The stereoscopic image display device as depicted in any one of Supplementary Notes 1 to 18, wherein the non-control region is constituted with a signal line, a partition wall, or a black matrix.

INDUSTRIAL APPLICABILITY

The present invention can be used widely for a display device that displays images capable of providing stereopsis or for a display device that displays different images for a plurality of observing positions, which are used in a television set, a personal computer, a smartphone, a tablet, a game machine, a car navigation device, and the like.

What is claimed is:

1. A stereoscopic image display device configured for providing bidirectional stereoscopic image display which displays parallax images for at least two viewpoints each simultaneously for a first direction, and a second direction the stereoscopic image display device comprising:
    a display panel in which pixels each constituted with a plurality of sub-pixels that are formed with electro-optic elements by corresponding to the parallax images are arranged in a matrix; and
    an optical module which distributes light emitted from the pixels arranged in the first direction to different directions from each other along the first direction and distributes light emitted from the pixels arranged in the second direction to different directions from each other along the second direction, wherein:
    the display panel includes first and second non-control regions which are regions existing between boundaries of apertures of the sub-pixels where controls of electro-optic conversion cannot be done;
    the first non-control region is extended along the first direction, and the second non-control region is extended along the second direction, respectively; and
    an intersection part of the first and the second non-control regions is disposed on a lattice point that is an intersection point of segments in a unit lattice that is constituted with lattice lines that are the segments disposed vertically and at an equivalent pitch, respectively, for the first direction and the second direction, and the first non-control region is bent at least once within the unit lattice with respect to the lattice line extending along the first direction, and the second non-control region is bent at least once within the unit lattice with respect to the lattice line extending along the second direction.

2. A stereoscopic image display device capable of providing bidirectional stereoscopic image display which displays parallax images for at least two viewpoints each simultaneously for a first direction and a second direction and unidirectional stereoscopic image display which displays parallax images for at least two viewpoints each for either the first direction or the second direction, the stereoscopic image display device comprising:
    a display panel in which pixels each constituted with a plurality of sub-pixels that are formed with electro-optic elements by corresponding to the parallax images are arranged in matrix; and
    an optical module which distributes light emitted from the pixels arranged in the first direction to different directions from each other along the first direction and distributes light emitted from the pixels arranged in the second direction to different directions from each other along the second direction, wherein:

the display panel includes first and second non-control regions which are regions existing between boundaries of apertures of the sub-pixels where controls of electro-optic conversion cannot be done;

the first non-control region is extended along the first direction, and the second non-control region is extended along the second direction, respectively; and one of the first and the second non-control regions is bent once in two lattice units constituted with lattice lines that are segments disposed vertically and at an equivalent pitch for the first direction and the second direction, respectively, the other one of the first and second non-control regions is bent at least once within the lattice unit, and intersection part of the first and the second non-control regions does not exist on two points out of four lattice points of the unit lattice.

3. The stereoscopic image display device as claimed in claim 1, wherein
the first direction and the second direction are orthogonal to each other.

4. The stereoscopic image display device as claimed in claim 1, wherein
the number of bending in the first non-control region within the unit lattice with respect to the lattice line extending along the first direction is the same as the number of bending in the second non-control region within the unit lattice with respect to the lattice line extending along the second direction.

5. The stereoscopic image display device as claimed in claim 1, wherein
the number of bending in the first non-control region within the unit lattice with respect to the lattice line extending along the first direction is "1" and an angle formed between the bending of the first non-control region and the lattice line extending along the first direction is 18 to 62 degrees; and the number of bending in the second non-control region within the unit lattice with respect to the lattice line extending along the second direction is "1", and an angle formed between the bending of the second non-control region and the lattice line extending along the second direction is 18 to 62 degrees.

6. The stereoscopic image display device as claimed in claim 1, wherein
the number of bending in the first non-control region within the unit lattice with respect to the lattice line extending along the first direction is "2" and an angle formed between the bending of the first non-control region and the lattice line extending along the first direction is 38 to 82 degrees; and the number of bending in the second non-control region within the unit lattice with respect to the lattice line extending along the second direction is "2", and an angle formed between the bending of the second non-control region and the lattice line extending along the second direction is 38 to 82 degrees.

7. The stereoscopic image display device as claimed in claim 1, wherein
in a case where a direction in parallel to a line connecting a left eye and a right eye of an observer is defined as a horizontal direction, a direction from the left eye to the right eye is defined as a positive direction, the second direction is aligned with the horizontal direction, a plurality of points of bending are provided on both sides of the lattice line extending along the first direction with respect to the lattice line that is orthogonal to the horizontal direction, and the positive direction is defined as a right side while a negative direction is defined as a left side, an area of a first polygon formed on the right side and an area of a second polygon formed on the left side between the lattice line extending along the first direction and the first non-control region are equivalent.

8. The stereoscopic image display device as claimed in claim 1, wherein
in a case where a direction in parallel to a line connecting a left eye and a right eye of an observer is defined as a horizontal direction, a direction from the left eye to the right eye is defined as a positive direction, the second direction is aligned with the horizontal direction, a plurality of points of bending are provided on both sides of the lattice line with respect to the lattice line extending along the second direction that is the horizontal direction, and the positive direction is defined as an upper side while a negative direction is defined as a lower side, an area of a first polygon formed on the upper side and an area of a second polygon formed on the lower side between the lattice line extending along the second direction and the second non-control region are equivalent.

9. The stereoscopic image display device as claimed in claim 1, wherein
in a case where a direction in parallel to a line connecting a left eye and a right eye of an observer is defined as a horizontal direction, a direction from the left eye to the right eye is defined as a positive direction, the second direction is aligned with the horizontal direction, and the positive direction is defined as a right side while a negative direction is defined as a left side with respect to the lattice line that is orthogonal to the horizontal direction, an area of a first polygon formed on the right side and an area of a second polygon formed on the left side between the lattice line orthogonal to the horizontal direction and the first non-control region, and an area of a third polygon formed on an upper side and an area of a fourth polygon formed on a lower side between the lattice line in parallel to the horizontal direction and the second non-control region, are all equivalent.

10. The stereoscopic image display device as claimed in claim 7, wherein
each of the polygons formed between the lattice line orthogonal to the horizontal direction and the first non-control region or between the lattice line in parallel to the horizontal direction and the second non-control region is a triangle.

11. The stereoscopic image display device as claimed in claim 1, wherein
in a case where length of the lattice line within the unit lattice is defined as P, diameter of a lattice circle formed by having the lattice point as a center is defined as D, and a normalized diameter is defined as D/P, the intersection part of the first and the second non-control regions is disposed within the lattice circle with the normalized diameter of 0.1 or smaller.

12. The stereoscopic image display device as claimed in claim 1, wherein
in a case where number of viewpoints in the first direction is defined as N and number of viewpoints in the second direction is defined as M (N and M are both integers of 2 or larger), the pixel is constituted with N×M pieces of sub-pixels.

13. The stereoscopic image display device as claimed in claim 1, wherein
width of the first non-control region and width of the second non-control region are different.

14. The stereoscopic image display device as claimed in claim 1, wherein
width of the first non-control region or the second non-control region changes continuously by corresponding to positions in the second direction or the first direction of the non-control region.

15. The stereoscopic image display device as claimed in claim 1, wherein
width of the first non-control region changes discontinuously by corresponding to positions in the second direction of the non-control region; or the second non-control region changes discontinuously by corresponding to positions in the first direction of the non-control region between, a first bent part or a unit lattice point, and a second bent point neighboring to the first bent point or the unit lattice point, in the first direction or the second direction, of the first non-control region or the second non-control region.

16. The stereoscopic image display device as claimed in claim 12, wherein
the N equals to the M.

17. The stereoscopic image display device as claimed in claim 1, wherein
a light-shield pattern existing within the aperture part of the sub-pixel is formed with segments in parallel to the first and the second non-control regions.

18. The stereoscopic image display device as claimed in claim 17, wherein
the light-shield pattern is a signal line, a switching element, a contact hole, or a source electrode.

19. The stereoscopic image display device as claimed in claim 1, wherein
the non-control region is constituted with a signal line, a partition wall, or a black matrix.

* * * * *